(12) United States Patent
Hwang et al.

(10) Patent No.: US 10,935,164 B2
(45) Date of Patent: Mar. 2, 2021

(54) DEVICE FOR SUPPORTING HORIZONTAL PIPE IN FOUR DIRECTIONS

(71) Applicant: MAKESOON INC., Busan (KR)

(72) Inventors: Jong Wook Hwang, Busan (KR); Han Chan Kim, Busan (KR); Hang Jun Lee, Busan (KR); Hyeong Min Jung, Busan (KR)

(73) Assignee: MAKESOON INC., Busan (KR)

( * ) Notice: Subject to any disclaimer, the term of this patent is extended or adjusted under 35 U.S.C. 154(b) by 0 days.

(21) Appl. No.: 16/605,880

(22) PCT Filed: Apr. 3, 2018

(86) PCT No.: PCT/KR2018/003901
§ 371 (c)(1),
(2) Date: Oct. 17, 2019

(87) PCT Pub. No.: WO2018/194295
PCT Pub. Date: Oct. 25, 2018

(65) Prior Publication Data
US 2020/0072390 A1 Mar. 5, 2020

(30) Foreign Application Priority Data

Apr. 17, 2017 (KR) .................. 10-2017-0049007
Oct. 20, 2017 (KR) .................. 10-2017-0136617

(51) Int. Cl.
*F16L 3/22* (2006.01)
*F16L 3/10* (2006.01)
*F16M 13/02* (2006.01)

(52) U.S. Cl.
CPC ......... *F16L 3/1066* (2013.01); *F16M 13/022* (2013.01)

(58) Field of Classification Search
CPC ............. F16L 3/1091; F16L 3/11; F16L 43/02
See application file for complete search history.

(56) References Cited

U.S. PATENT DOCUMENTS

| 2,335,833 | A | * | 11/1943 | Wood | F16L 3/217 |
| | | | | | 248/542 |
| 4,078,752 | A | * | 3/1978 | Kindorf | F16L 3/00 |
| | | | | | 248/354.4 |

(Continued)

FOREIGN PATENT DOCUMENTS

| CN | 204357363 U | 5/2015 |
| CN | 205226634 U | 5/2016 |

(Continued)

OTHER PUBLICATIONS

International Search Report for PCT/KR2018/003901 dated Aug. 9, 2018 from Korean Intellectual Property Office.

*Primary Examiner* — Amy J. Sterling
(74) *Attorney, Agent, or Firm* — Paratus Law Group, PLLC

(57) ABSTRACT

Disclosed is a device for supporting a horizontal pipe in four directions including: a clamp member fixed while surrounding a pipe, and a first support and a second support which are coupled to a bracket of which one end is coupled to the clamp member and the other end is fixed to a slab. The clamp member is constituted by a first member formed in a semi-arc shape, a second member formed in an arc shape at an angle of 120° to 150°, and a third member formed at an angle of 30° to 60° from a vertical direction.

10 Claims, 25 Drawing Sheets

(56) References Cited

U.S. PATENT DOCUMENTS

| | | | | |
|---|---|---|---|---|
| 6,126,119 A | * | 10/2000 | Giangrasso | ............ F16L 55/035 |
| | | | | 248/58 |
| 2016/0289957 A1 | * | 10/2016 | Roth | ........................ F16B 9/052 |

FOREIGN PATENT DOCUMENTS

| CN | 205226635 U | 5/2016 |
|---|---|---|
| JP | H04-64683 U | 6/1992 |
| KR | 20-0197294 Y1 | 9/2000 |
| KR | 10-2016-0057358 A | 5/2016 |
| KR | 10-2016-0058072 A | 5/2016 |
| KR | 20-2016-0001755 U | 5/2016 |
| KR | 20-2016-0002992 U | 8/2016 |

* cited by examiner

DEVICE FOR SUPPORTING HORIZONTAL PIPE IN FOUR DIRECTIONS

CROSS-REFERENCE TO PRIOR APPLICATIONS

This application is a National Stage Patent Application of PCT International Patent Application No. PCT/KR2018/003901 (filed on Apr. 3, 2018) under 35 U.S.C. § 371, which claims priority to Korean Patent Application Nos. 10-2017-0049007 (filed on Apr. 17, 2017) and 10-2017-0136617 (filed on Oct. 20, 2017), which are all hereby incorporated by reference in their entirety.

BACKGROUND

The present invention relates to a device for supporting a horizontal pipe in four directions which is applied to a pipe installed in a building, and more particularly, to a device for supporting a horizontal pipe in four directions, in which two supports capable of withstanding horizontal earthquake loads in both an axial (longitudinal) direction and an axially perpendicular (transverse) direction of the pipe are coupled to a single clamp to prevent deformation and damage of the pipe, a configuration of the supports is simplified to be manufactured at a low price, and a functionality is provided to enable an operator to easily check and install a coupling angle between the clamp and the support, thereby simply and accurately performing an installation operation.

Further, the present invention is to have a function of a hanger to remove a normal operation process in which the supports are doubly installed after the hanger of the pipe is installed.

A pipe installed in a building is fixed and installed to a slab by a supporting device. The supporting device has a basic function of holding a pipe and a function of safely protecting the pipe to withstand a horizontal earthquake load generated by the earthquake.

The supporting device applied to the pipe is required to absorb a longitudinal vibration and absorb a transverse vibration and various prior arts have been proposed.

As an example of absorbing a longitudinal vibration, there is proposed a supporting device for preventing a longitudinal vibration including a pipe in Korean Patent Publication No. 10-2016-0057358 (May 23, 2016). A configuration thereof includes a first clamp fixing one side of an outer surface of the top of a pipe; a second clamp located with a predetermined interval from the first clamp to fix one side of an outer surface of the bottom of the pipe; a fixing portion fixing one side of the first clamp and one side of the second clamp; a first hinge portion rotatably installed and fixing the other side of the first clamp and the other side of the second clamp; a first connection portion rotatably installed in the first hinge portion to absorb the shock of earthquake waves and prevent the pipe from being vibrated at the same time; a first rotational means located with a predetermined interval from the first connection portion; a third connection portion rotatably installed in the first rotational means to absorb the shock of earthquake waves and prevent the pipe from being vibrated at the same time; and a first pipe screw-coupled between the first connection portion and the third connection portion to absorb the shock of earthquake waves and prevent the pipe from being vibrated at the same time.

Further, as an example of absorbing a transverse vibration, there is proposed a supporting device for prevention of vibration in Korean Patent Publication No. 10-2016-0058072 (May 24, 2016). A configuration thereof includes a first rotational means; a first connection portion rotatably installed in the first rotational means to absorb the shock of earthquake waves and prevent the pipe from being vibrated at the same time; a first pipe detachably screw-coupled to the first connection portion to absorb the shock of earthquake waves and prevent the pipe from being vibrated at the same time; a first clamp installed at one side of an outer surface of the first pipe; a hinge portion installed at one side of the first clamp; a second clamp installed at one side of the outer surface of the first pipe with a predetermined interval from the first connection portion; a third clamp located between the first clamp and the second clamp and installed at one side of the outer surface of the first pipe; a U band installed at the third clamp while installed at the second clamp to fix the pipe; a second rotational means located with a predetermined interval from the first rotational means; a second connection portion rotatably installed at the second rotational means to absorb the shock of earthquake waves and prevent the pipe from being vibrated at the same time; a second clamp detachably screw-coupled to the second connection portion to absorb the shock of earthquake waves and prevent the pipe from being vibrated at the same time; and a fourth clamp installed at one end of an outer surface of the second pipe with a predetermined interval from the second connection portion and installed at one side of an upper surface of the first clamp by the hinge portion.

However, the supporting device of the configurations has a problem in which the configuration is complicated and a lot of manufacturing cost is required, and particularly, there is an inconvenience to be installed on the pipe to absorb both vibrations in the longitudinal direction and the transverse direction.

Meanwhile, as a means capable of solving the inconvenience, there is proposed a device for prevention of vibration in Korean Utility Model Publication No. 20-2016-0001755 (May 24, 2016). A configuration thereof includes an upper clamp fixing one side of an outer surface of the top of a pipe; a lower clamp located with a predetermined interval from the upper clamp to fix one side of an outer surface of the bottom of the pipe; a first rotational means rotatably installed at one side of an upper surface of the upper clamp to rotate by earthquake waves; a second rotational means rotatably installed on a ceiling surface with a predetermined interval from the first rotational means to rotate by earthquake waves; and a screw rod installed between the first rotational means and the second rotational means to rotate by rotation of the first and second rotational means and absorb the shock of earthquake waves.

However, in the prior art, first and second screw rods installed in transverse and longitudinal directions are assembled by coupling the first connection portion to the clamp and mutually coupling the third to seventh connection portions to the first connection portion to enable a supporting function. Thus, there is a problem that the configuration is complicated and manufacturing costs are increased.

A means capable of checking a slope of the screw rod is absent, and thus there is a need to install a support at 30 degrees or more as regulated in the Fire Services Art. However, since the support is not installed to meet the regulations in the field, cases for re-construction frequently occur, and thus in the industry, a supporting device of a novel configuration which can solve these problems at the same time has been required.

Further, when an earthquake-proof support is to be used only in an axial (longitudinal) direction and an axially perpendicular (transverse) direction, or in the axial direction or the axially perpendicular direction of the pipe, a hanger is installed before the support is applied to the pipe and then the support is installed, and thus the support and the hanger are doubly installed. To solve the problems, the hanger is installed in a flange fastened to a socket nut or a first member to remove a process of installing doubly the earthquake-proof support and the hanger.

SUMMARY

Therefore, the present inventors studied and developed the present invention to solve a problem to install a plurality of supporting devices by withstanding vibrations in an axial (longitudinal) direction or an axially perpendicular (transverse) direction in various supporting devices having anti-earthquake related to a conventional pipe installation and a problem in that a construction is difficult at an accurate angle when a coupling angle between a clamp and a support is larger than 30 degrees, and reduce an operation process of installing doubly a hanger supporting the pipe before the support is installed.

In other words, in the present invention, the present inventors completed the present invention with respect to a technical aspect of the present invention by providing a device for supporting a horizontal pipe in four directions in which a support withstanding a horizontal earthquake load in an axial (longitudinal) direction of the pipe by dividing the clamp into two equal parts or three equal parts and a support withstanding a horizontal earthquake load in an axially perpendicular (transverse) direction of the pipe are applied together to prevent a deformation or damage to the pipe, a configuration of the support is simplified and then provided in a length adjustable structure to be manufactured at a low price, a means capable of displaying an angle is provided at a coupling member provided at both ends of the flange formed in the clamp and the support to enable an operator to simply perform a construction at a desired installation angle, thereby accurately and rapidly performing a construction process, and a functionality of a general hanger is provided to support a pipe before the support is installed.

As a technical solution, according to the present invention, first, there is provided a device for supporting a horizontal pipe in four directions comprising: a clamp member fixed while surrounding a pipe, and a first support and a second support which are coupled to a bracket of which one end is coupled to the clamp member and the other end is fixed to a slab, wherein the clamp member is constituted by a first member formed in a semi-arc or quarter-arc shape, a second member formed in an arc shape at an angle of 120° to 150° from a horizontal direction, and a third member formed at an angle of 30° to 90° from a vertical direction, the first support is installed to be inclined at an angle of 30° to 90° from a vertical direction to an axial (longitudinal) direction of the pipe as a configuration fixed between flanges coupling the first member and the third member and to the bracket fixed to the slab so as to withstand a horizontal earthquake load in the axial (longitudinal) direction of the pipe, and the second support is installed to be inclined at an angle of 30° to 90° from a vertical direction to an axially perpendicular (transverse) direction of the pipe as a configuration fixed between flanges coupling the second member and the third member and to the bracket fixed to the slab so as to withstand a horizontal earthquake load in the axially perpendicular (transverse) direction of the pipe.

Second, there is provided a device for supporting a horizontal pipe in four directions comprising: a clamp member fixed while surrounding a pipe, and a first support and a second support which are coupled to a bracket of which one end is coupled to the clamp member and the other end is fixed to a slab, wherein the clamp member is constituted by a first member formed in a semi-arc shape, and a second member formed in a concave, in which an assembly groove formed in an arc shape at an angle of 30° to 60° is cut in a circumferential direction and a plurality of locking grooves connected with the assembly groove are formed on an inner peripheral surface coming into a contact with the pipe, the first support is installed to be inclined at an angle of 30° to 90° from a vertical direction to an axial (longitudinal) direction of the pipe as a configuration fixed between flanges coupling the first member and the second member and to the bracket fixed to the slab so as to withstand a horizontal earthquake load in the axial (longitudinal) direction of the pipe, and the second support is installed to be inclined at an angle of 30° to 90° from a vertical direction to an axially perpendicular (transverse) direction of the pipe as a configuration fixed to a fixture of which a lower end is locked to a locking groove while inserted through the assembly groove formed in the second member and to the bracket fixed to the slab so as to withstand a horizontal earthquake load in the axially perpendicular (transverse) direction of the pipe.

Third, there is provided a device for supporting a horizontal pipe in four directions comprising: a clamp member fixed while surrounding a pipe, and a first support and a second support which are coupled to a bracket of which one end is coupled to the clamp member and the other end is fixed to a slab, wherein the clamp member is constituted by a first member 21 formed in a semi-arc shape and a second member, wherein in any one or both sides of the first and second members, the flanges are welded and integrally provided at 30° to 60° from a vertical direction to be located at an axial side of the clamp member, the first support is installed to be inclined at an angle of 30° to 90° from a vertical direction to an axial (longitudinal) direction of the pipe 200 as a configuration fixed between flanges coupling the first member and the second member and to the bracket fixed to the slab so as to withstand a horizontal earthquake load in the axial (longitudinal) direction of the pipe, and the second support is installed to be inclined at an angle of 30° to 60° from a vertical direction to an axially perpendicular (transverse) direction of the pipe as a configuration fixed to the flange provided at an angle of 30° to 90° from a vertical direction in any one or both sides of the first and second members and to the bracket fixed to the slab so as to withstand a horizontal earthquake load in the axially perpendicular (transverse) direction of the pipe.

Fourth, there is provided a device for supporting a horizontal pipe in four directions comprising: a clamp member fixed while surrounding a pipe, and a first support and a second support which are coupled to a bracket of which one end is coupled to the clamp member and the other end is fixed to a slab, wherein the clamp member is constituted by a first member formed in a semi-arc shape and a second member to be horizontally assembled with each other, wherein the flanges are welded and integrally provided to be located at an axial side of the clamp member vertically in the first member located at the slab side, the first support is installed to be inclined at an angle of 30° to 90° from a vertical direction to an axial (longitudinal) direction of the pipe as a configuration fixed between flanges formed vertically to the first member and to the bracket fixed to the slab so as to withstand a horizontal earthquake load in the axial (longitudinal) direction of the pipe, and the second support is installed to be inclined at an angle of 30° to 90° from a vertical direction to an axially perpendicular (transverse) direction of the pipe as a configuration fixed to flanges coupling the first and second members to each other and to the bracket fixed to the slab so as to withstand a horizontal earthquake load in the axially perpendicular (transverse) direction of the pipe.

Fifth, there is provided a device for supporting a horizontal pipe in four directions comprising: a clamp member fixed while surrounding a pipe, and a first support and a second support which are coupled to a bracket of which one end is coupled to the clamp member and the other end is fixed to a slab, wherein the clamp member is constituted by a first member formed in a semi-arc shape and a second member, wherein in any one or both sides of the first and second members, the flanges are welded and integrally provided at 30° to 60° from a vertical direction to be located in a circumferential direction, the first support is installed to be inclined at an angle of 30° to 90° from a vertical direction to an axial (longitudinal) direction of the pipe as a configuration fixed between flanges coupling the first member and the second member and to the bracket fixed to the slab so as to withstand a horizontal earthquake load in the axial (longitudinal) direction of the pipe, and the second support is installed to be inclined at an angle of 30° to 60° from a vertical direction to an axially perpendicular (transverse) direction of the pipe as a configuration fixed to the flange provided at an angle of 30° to 90° from a vertical direction in any one or both sides of the first and second members and in a circumferential direction and to the bracket fixed to the slab so as to withstand a horizontal earthquake load in the axially perpendicular (transverse) direction of the pipe.

Sixth, the first support or the second support includes a lower fixing member coupled with the clamp member, a screw rod screw-coupled to the lower fixing member, an upper fixing member screw-coupled to an upper end of the screw rod, and a bracket fixed to the slab to which the upper fixing member is coupled.

Seventh, a buffer material made of a rubber material is additionally constituted on inner peripheral surfaces of the first member and the second member constituting the clamp member.

Eighth, the lower fixing member or the upper fixing member has a coupling piece coupled between the flanges at one side by press-cutting a steel plate and a nut insertion groove formed to form an adjustment space inwardly at an opposite side of the coupling piece to weld and fix a bolt assembled with the screw rod.

Ninth, the coupling piece constituting the lower fixing member is bent and formed at an angle of 30° to 90° from a vertical direction.

Tenth, the lower fixing member or the upper fixing member is formed by bending a flat steel, wherein a connection piece is bent and formed so that an adjustment space is formed below the coupling piece, and a screw-rod coupling plate formed with a screw hole is bent and formed below the connection piece to be located on the same axis as the coupling piece.

Eleventh, the lower fixing member or the upper fixing member is formed by die casting, wherein a body is integrally formed above the coupling piece, an adjustment space is formed through the body in an axially perpendicular direction, and a screw hole is formed at an upper end of the body to communicate with the adjustment space.

Twelfth, a hanger constituted by a socket type nut coupled to an anchor bolt fixing the bracket constituting the first support, a screw rod coupled to the socket type nut, a connector coupled to a lower end of the screw rod, and a clip coupled to a lower end of the connector to clamp the pipe.

Thirteenth, the hanger for installing the pipe is installed at the bracket fixed to the slab as a constituted member of the second support.

Fourteenth, in any one of the flanges coupling the first member and the third member and any one of the flanges coupling the second member and the third member, an angle display portion is formed, and in the lower fixing member, a display means forming an indicator corresponding to the angle display portion is provided to precisely provide an installation angle of the first and second supports.

Fifteenth, in any one of the flanges coupling the first member and the second member and the fixture coupled to the second member, an angle display portion is formed, and in the lower fixing member, a display means forming an indicator corresponding to the angle display portion is provided to precisely provide an installation angle of the first and second supports.

Sixteenth, in any one of the flanges coupling the first member and the second member and the flanges fixed to any one or both sides of the first and second members, an angle display portion is formed, and in the lower fixing member, a display means forming an indicator corresponding to the angle display portion is provided to precisely provide an installation angle of the first and second supports.

Seventeenth, in any one of the flanges coupling the first member and the third member and any one of the flanges coupling the second member and the third member, a stopper means is provided to prevent the lower fixing member from being installed at an inclined angle of 30° or less.

Eighteenth, the stopper means has a locking step formed to be bent downwardly while protruding outwardly at an upper portion of any one of the flanges coupling the first member and the third member and any one of the flanges coupling the second member and the third member to prevent the lower fixing member from being installed at an inclined angle of 30° or less from a vertical direction.

Nineteenth, the stopper means has a locking protrusion formed to protrude inwardly by pressing at an upper portion of any one of the flanges coupling the first member and the third member and any one of the flanges coupling the second member and the third member to prevent the lower fixing member from being installed at an inclined angle of 30° or less from a vertical direction.

Twentieth, the stopper means has a plurality of angle adjustment holes formed at 30°, 45°, and 60° in the flanges coupling the first member and the third member and the flanges coupling the second member and the third member and a fixing hole formed on a central line of the lower fixing member to communicate with any one of the angle adjustment holes formed in the flange, so that the angle adjustment hole and the fixing hole may be fixed to each other by a fixing pin to prevent the lower fixing member from being installed at an inclined angle of 30° or less from a vertical direction.

Twenty-first, in any one of the flanges coupling the first member and the second member and the fixture coupled to the second member, a stopper means is provided to prevent the lower fixing member from being installed at an inclined angle of 30° or less.

Twenty-second, the stopper means has a locking step formed to be bent downwardly while protruding outwardly at an upper portion of any one of the flanges coupling the first member and the second member and the fixture to prevent the lower fixing member from being installed at an inclined angle of 30° or less from a vertical direction.

Twenty-third, the stopper means has a locking protrusion formed to protrude inwardly by pressing at the upper portion of any one of the flanges coupling the first member and the second member and the fixture to prevent the lower fixing member from being installed at an inclined angle of 30° or less from a vertical direction.

Twenty-fourth, the stopper means has a plurality of angle adjustment holes formed at 30°, 45°, and 60° at the flanges coupling the first member and the third member and the fixture and a fixing hole formed on a central line of the lower fixing member to communicate with any one of the angle adjustment holes formed in the flange and the fixture, so that the angle adjustment hole and the fixing hole may be fixed to each other by a fixing pin to prevent the lower fixing member from being installed at an inclined angle of 30° or less from a vertical direction.

Twenty-fifth, in any one of the flanges coupling the first member and the second member and the flange fixed to any one or both sides of the first and second members, a stopper means is provided to prevent the lower fixing member from being installed at an inclined angle of 30° or less.

Twenty-sixth, the stopper means has a locking step formed to be bent downwardly while protruding outwardly at an upper portion of any one of the flanges coupling the first member and the second member and the flange fixed to any one or both sides of the first and second members.

Twenty-seventh, the stopper means has a locking protrusion formed to protrude inwardly by pressing at the upper portion of any one of the flanges coupling the first member and the second member and the flange fixed to any one or both sides of the first and second members to prevent the lower fixing member from being installed at an inclined angle of 30° or less from a vertical direction.

Twenty-eighth, the stopper means has a plurality of angle adjustment holes formed at 30°, 45°, and 60 in the flanges coupling the first member and the second member and the flange fixed to any one or both sides of the first and second members and a fixing hole formed on a central line of the lower fixing member to communicate with any one of the angle adjustment holes formed in the flange, so that the angle adjustment hole and the fixing hole may be fixed to each other by a fixing pin to prevent the lower fixing member from being installed at an inclined angle of 30° or less from a vertical direction.

Twenty-ninth, the stopper means has a flat portion formed to support a lower surface of the coupling piece of the lower fixing member at an angle of 30° by coming into a contact with the pipe to prevent the lower fixing member from being installed at an inclined angle of 30° or less from a vertical direction.

Thirtieth, the stopper means has a locking protrusion formed to protrude from the coupling piece of the lower fixing member to prevent the lower fixing member from being installed at an inclined angle of 30° or less from a vertical direction.

Thirty-first, a hanger-combined flange is further installed at a member formed with the flange of the first and second members to couple the first support or the hanger.

Thirty-second, the flange is formed by bending a steel plate in a ⊔ shape to fix a connection portion side to the first member or the second member; and the connection portion of the flange is constituted to meet a width of the clamp member or have a smaller width than the width of the clamp member.

Thirty-third, the second support is a pipe in which an upper end is coupled by a fixing means consisting of a bolt and a nut to be rotatable on the bracket fixed to the slab, and a lower end is coupled by the fixing means consisting of a bolt and a nut to be rotatable on the flange constituted by bending a steel plate in a ⊔ shape.

Thirty-fourth, the second support is constituted as a configuration including an inner side or outer side of the flange constituted by bending a steel plate in a ⊔ shape, a lower fixing member and an upper fixing member which are coupled to the bracket fixed to the slab, a screw rod connecting the lower fixing member and the upper fixing member to each other, and a nut fastened to the screw rod.

Thirty-fifth, the lower fixing member and the upper fixing member are constituted by configuration including a pair of fixing plates facing each other and connection plates connecting one sides of these fixing plates, wherein fixing holes are formed in the fixing plates at both sides to couple the fixing means consisting of a bolt and a nut by communicating with the hole formed in the flange, and screw-rod assembly holes to which a screw rod is inserted are formed in the connection plates, so as to be constituted by bending the steel plate in a ⊔ shape like the flange.

Thirty-sixth, inclined surfaces at an angle of 45° are formed at an upper end of the flange and both upper ends of the fixing plates constituting the lower fixing member and the upper fixing member.

In the case of using the device for supporting a horizontal pipe in four directions provided in the present invention, there are the following effects.

Since a configuration of configuring a clamp member into two members and coupling two supports at the same time is provided, the configuration is simplified.

Since the vibrations in an axial (longitudinal) direction or an axially perpendicular (transverse) direction of the pipe are absorbed in the two supports, anti-earthquake is excellent.

A configuration of the two supports is simplified and easily manufactured, and can be manufactured at low manufacturing cost.

An angle display portion and an indication portion are formed at a lower fixing member configuring the flange and the first and second supports of the clamp member, so that an operator may easily apply an installation angle of the first and second supports as desired by using the angle display portion and the indication portion.

Since a stopper means is provided in the flange and the first and second supports of the clamp member, when installing the first and second supports, the construction is not possible at an angle smaller than 30 degrees defined in the fire reference, thereby perfectly solving problems due to the amount of construction.

After the hanger fixing the pipe is installed before the anti-earthquake support is installed, the support is installed, thereby removing an operation process of fixing and supporting the pipe doubly.

DETAILED DESCRIPTION

Hereinafter, a preferred example of a device for supporting a horizontal pipe in four directions provided in the present invention will be described with reference to the accompanying drawings.

Figure 1:
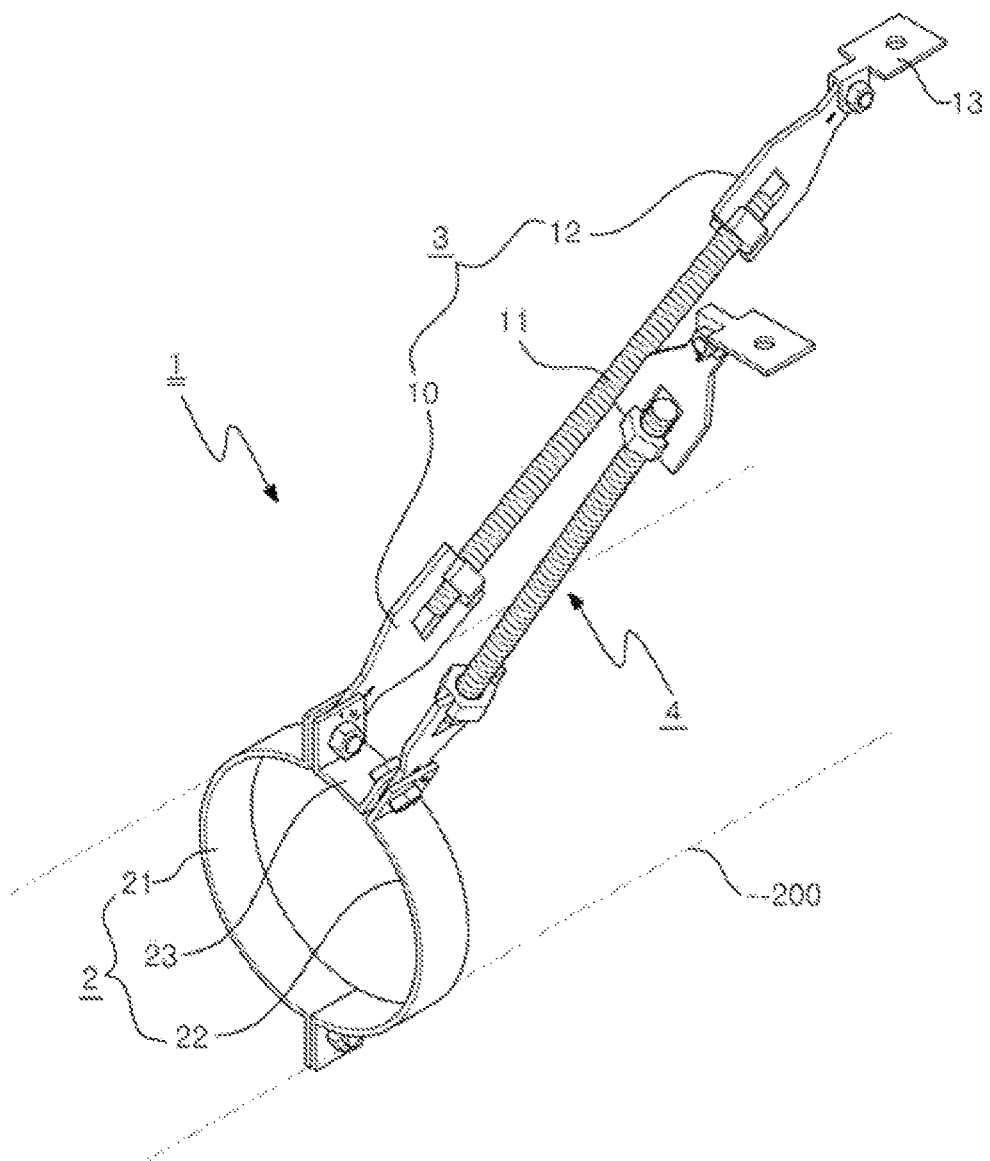
FIG. 1 is a perspective view showing a preferred example of a device for supporting a horizontal pipe in four directions provided in the present invention.
Figure 2:
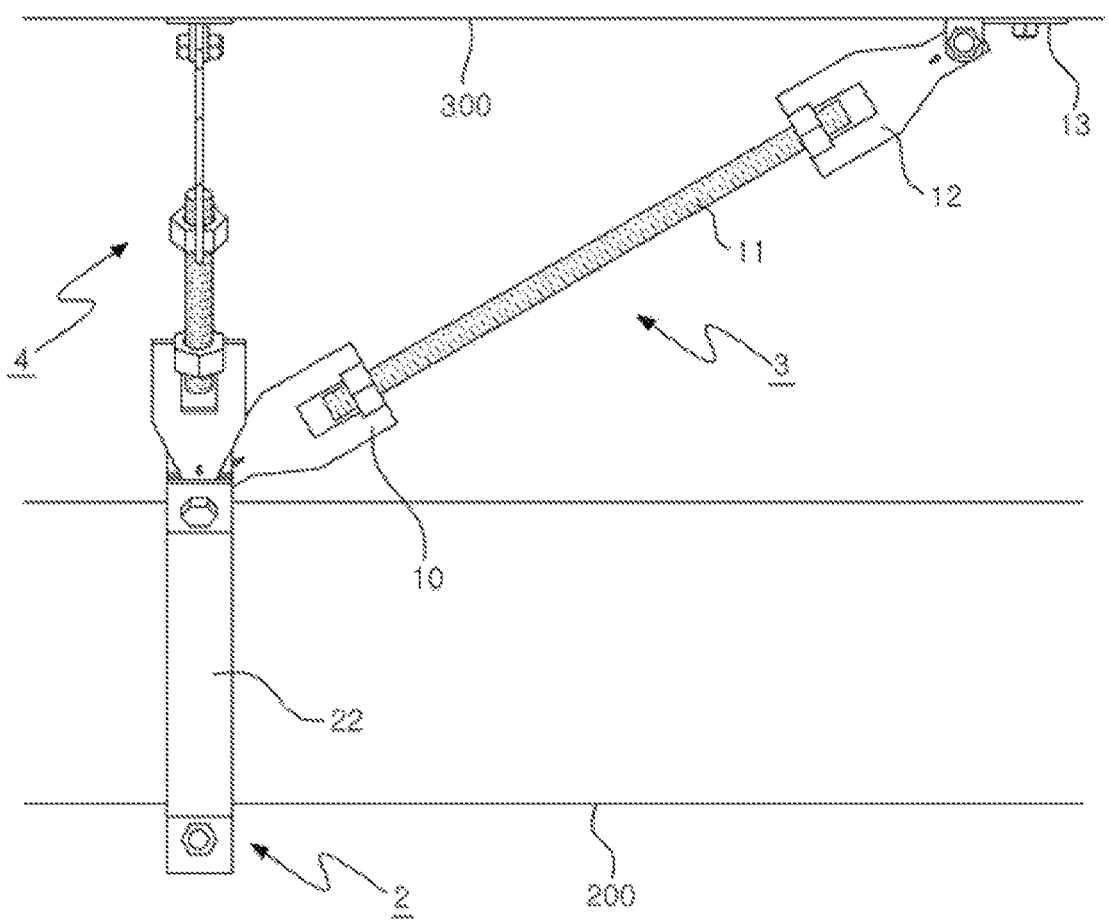
FIG. 2 is a front view of FIG. 1.
Figure 3:
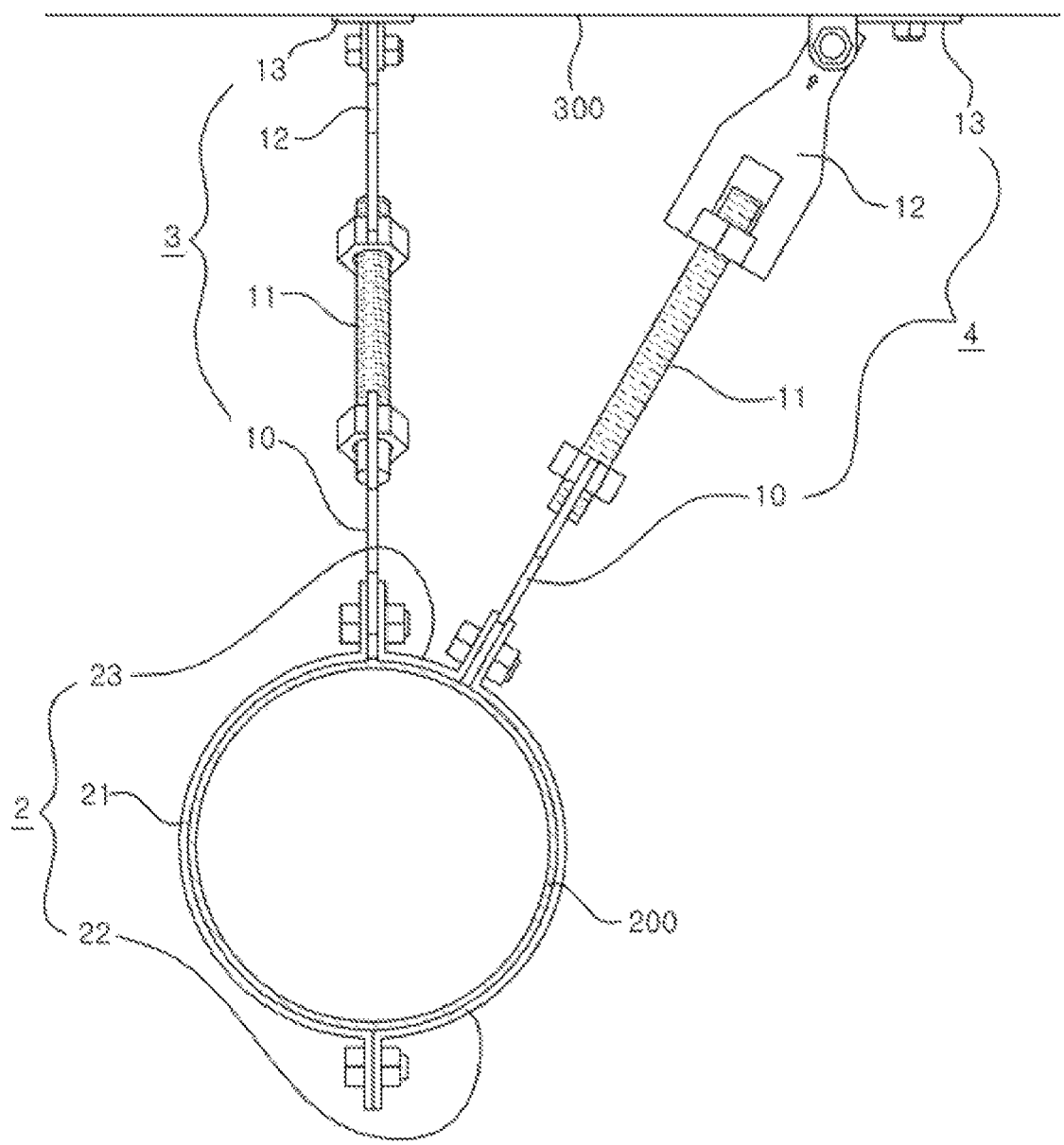
FIG. 3 is a laterally cross-sectional view of FIG. 1.

FIG. 1 is a perspective view showing a preferred example of a device for supporting a horizontal pipe in four directions provided in the present invention, FIG. 2 is a front view of FIG. 1, and FIG. 3 is a laterally cross-sectional view of FIG. 1.

A device 1 for supporting a horizontal pipe in four directions provided in the present invention is applied to various pipes 200 which supply fluids, such as water and sewage pipes, gas pipes, and fire pipes installed in buildings. Particularly, the device 1 may safely protect the pipes 200 to withstand horizontal earthquake loads generated in an axial (longitudinal) direction and an axially perpendicular (transverse) direction of the pipe 200 when the earthquake occurs.

To this end, the device 1 for supporting the horizontal pipe in four directions of the present invention is constituted by a configuration including one clamp member 2 coupled while surrounding the pipe 200, and a first support 3 and a second support 4 installed between the clamp member 2 and a slab 300.

The first support 3 may withstand the horizontal earthquake load in the axial (longitudinal) direction, and is installed to be inclined at 30 degrees or more and 90 degrees or less vertically in the axial (longitudinal) direction of the pipe 200 as shown in FIG. 2. The second support 4 is installed to be inclined at 30 degrees or more and 90 degrees or less vertically in the axially perpendicular (transverse) direction (circumferential direction) of the pipe 200 as shown in FIG. 3.

For reference, in case a support is installed to have anti-earthquake, it is specified in the fire services art to provide a slope of at least 30 degrees or more on a vertical line connecting the slab 300 and the bottom.

Figure 4:
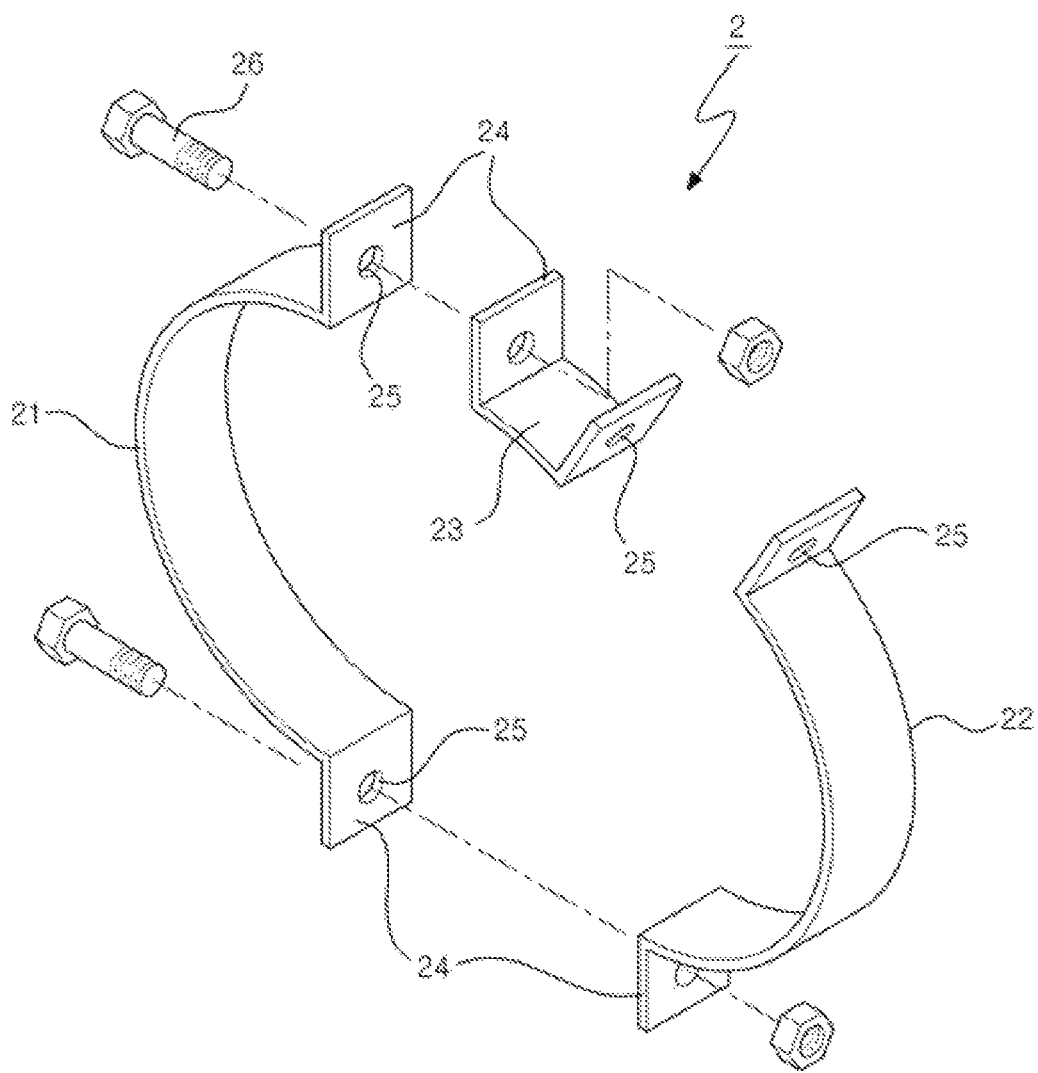
FIG. 4 is an exploded perspective view showing an example of a clamp member which may be applied to the present invention.

FIG. 4 is an exploded perspective view showing an example of a clamp member which may be applied to the present invention.

An example of a clamp member 2 provided in the present invention is constituted by three members as shown in FIG. 4. That is, the clamp member 2 is constituted by a first member 21 formed in a semi-arc shape, a second member 22 in an arc shape at an angle of 120° to 150°, and a third member 23 formed at an angle of 30° to 60° from a vertical direction.

In the first to third members 21, 22, and 23, flanges 24 are formed at both ends and fixing holes 25 are formed in the flanges 24, and then the flanges 24 and the fixing holes 25 may be fastened to each other by a fastening means 26 consisting of a bolt and a nut. When the first to third members 21, 22, and 23 are coupled to each other, an arc coming into a contact with the pipe 200 is formed on an inner peripheral surface.

Figure 5:
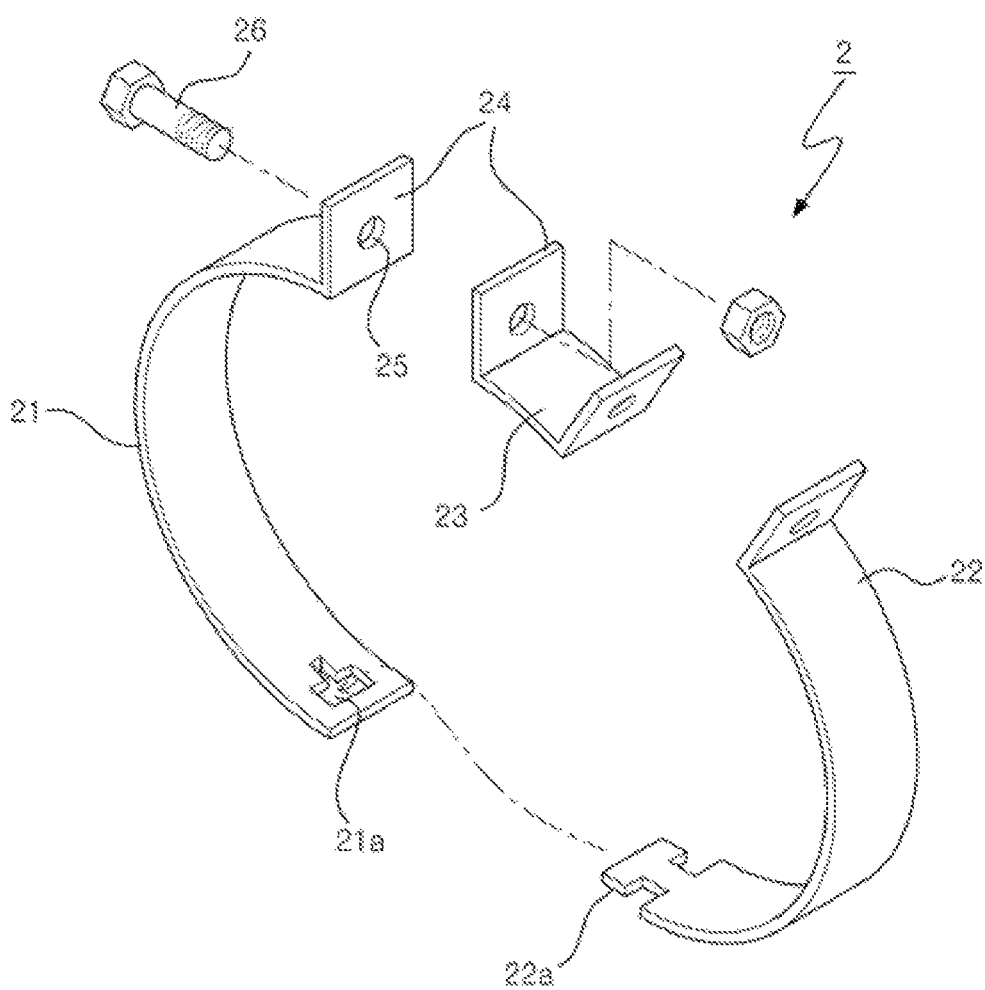
FIG. 5 is an exploded perspective view showing another example of a clamp member which may be applied to the present invention.

FIG. 5 is an exploded perspective view showing another example of a clamp member which may be applied to the present invention.

A clamp member 2 provided in FIG. 5 is configured by the first to third members 21, 22, and 23 as described above, in which a configuration connecting the first member 21 and the second member 22 may be formed by a hinge type. A hinge groove 21*a* is formed on the first member 21, a hinge piece 22*a* is formed in the second member 22, and then the hinge groove 21*a* and the hinge piece 22*a* are assembled to each other to be rotatably configured. The configuration connecting the two members to each other is a general configuration, and thus a detailed description thereof will be omitted.

Figure 6:
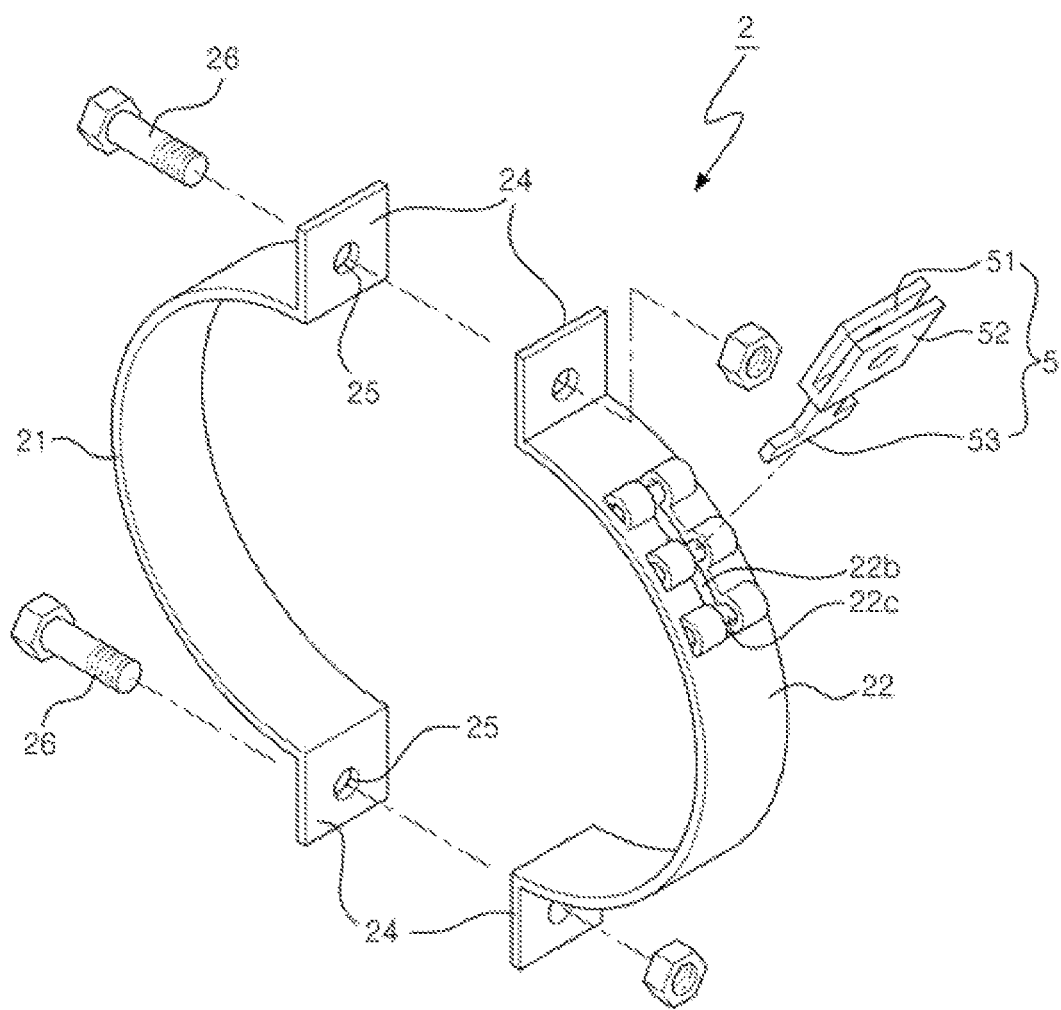
FIG. 6 is an exploded perspective view showing yet another example of a clamp member which may be applied to the present invention.

FIG. 6 is an exploded perspective view showing yet another example of a clamp member which may be applied to the present invention.

A clamp member 2 in FIG. 6 is constituted by combining the first member 21 and the second member 22 formed in a semi-arc shape unlike this. At this time, in the second member 22, an assembly groove 22b formed in an arc shape at an angle of 30° to 90° from the vertical direction is cut in a circumferential direction, and a plurality of locking grooves 22c connected with the assembly groove 22b are formed in an axial (longitudinal) direction on an inner peripheral surface coming into a contact with the pipe 200. In the present invention, an example formed with three locking grooves 22c is shown, and the locking grooves 22c are formed at locations of 30°, 45°, and 60°, respectively.

Further, the clamp member 2 provided in FIG. 6 has a configuration further including a fixture 5. The fixture 5 is constituted by a configuration including a fixing piece 52 facing an insertion space 52 formed so that the lower fixing member 10 of the second support 4 is inserted upwardly, and an anchor portion 53 which is inserted through the assembly groove 22b formed on the second member 22 downwardly and rotated at 90° to be locked to the locking groove 22c.

At this time, the anchor portion 53 provided in the fixture 5 is selectively coupled to a plurality of locking grooves 22c formed on the second member 22 to allow the fixture 5 to be located at angles of 30°, 45°, and 60.

Further, in the first member 21 and the second member 22, as shown in FIG. 6, flanges 24 are formed upwardly and downwardly to be coupled to each other, but as shown in FIG. 5, one side thereof may be configured by a hinge type.

Figure 7:
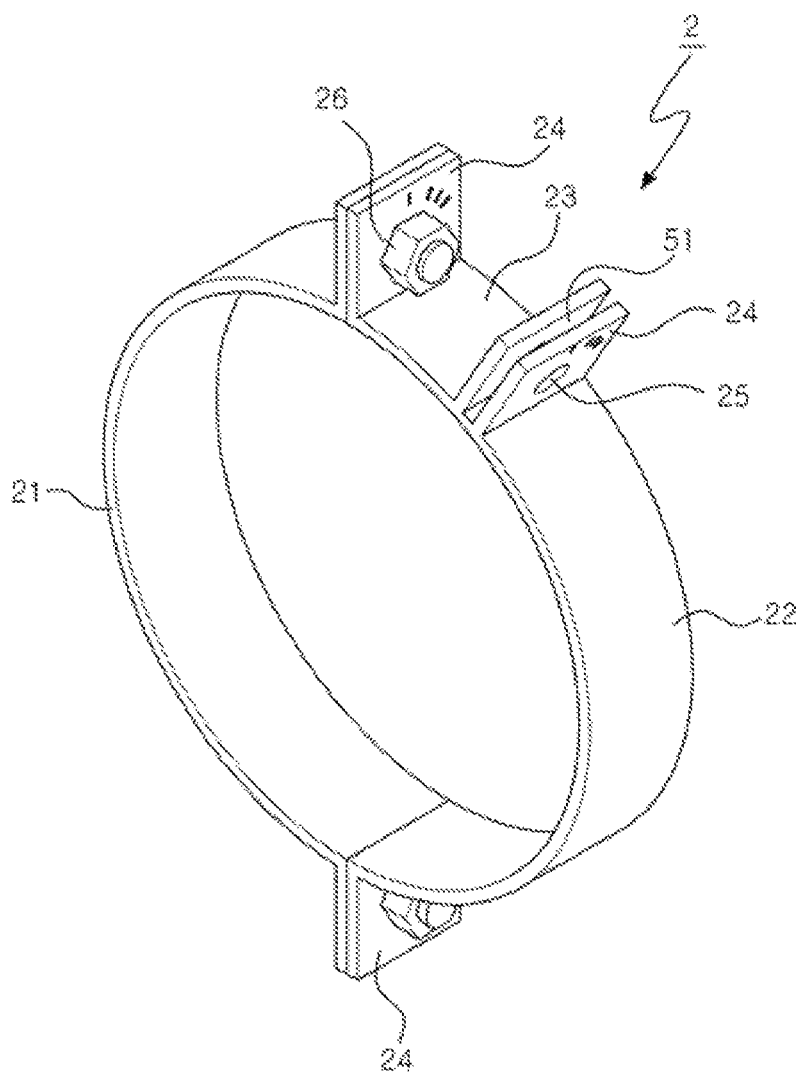
FIG. 7 is a perspective view showing still another example of a clamp member which may be applied to the present invention.

FIG. 7 is an exploded perspective view showing yet another example of a clamp member which may be applied to the present invention.

A clamp member 2 in FIG. 7 is constituted by combining the first member 21 and the second member 22 formed in a semi-arc shape. In any one or both of the first member 21 and the second member 22, a configuration which attaches flanges 24 in an axial direction of the clamp member 2 at an angle of 30° to 60° from the vertical direction is provided.

The flange 24 is provided with one or a pair, and the insertion space 51 to which the lower fixing member 10 of the second support 4 is inserted is formed or fastened between the flanges 24. If necessary, one flange 24 may also be formed without an insertion space, and the flange 24 may also be formed at an angle of 90°.

Figure 8:
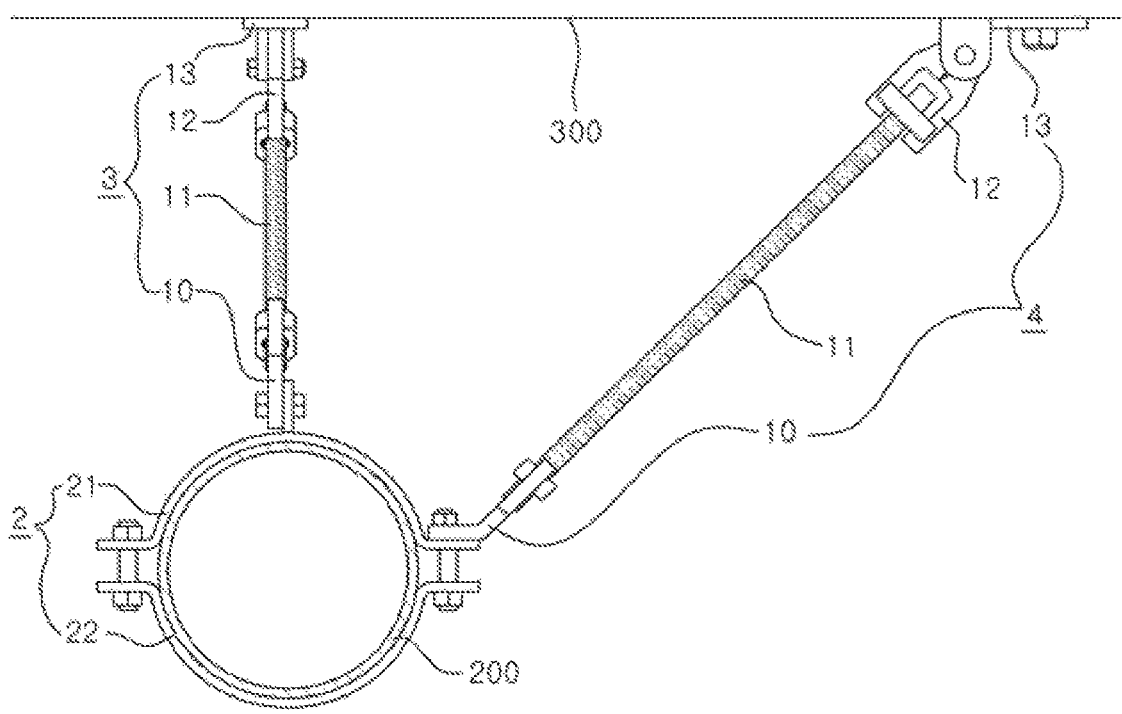
FIG. 8 is a laterally cross-sectional view showing an example of applying first and second supports by installing a flange in the clamp member applied to FIG. 7 at an angle of 90 degrees.

FIG. 8 is a laterally cross-sectional view showing an example of applying first and second supports by installing flanges in the clamp member applied to FIG. 7 at an angle of 90°.

This is a configuration in which the flanges 24 of the first member 21 and the second member 22 formed in semi-arc shapes are coupled to the pipe 200 to be located in a horizontal state, a flange 24 is further formed vertically in the first member 21 located at an upper side, a first support 3 absorbing a vibration in an axially perpendicular (transverse) direction is installed in the flange 24 formed vertically to the first member 21, and a second support 4 absorbing a vibration in an axially perpendicular (transverse) direction is installed in the flanges 24 coupling the first and second supports 21 and 22 to each other.

At this time, to be able to couple the second support 4 with the slab 300 in an inclined shape, a coupling piece 15 of a lower fixing member 10 configuring the second support 4 is bent upward so as to face the slab 300 in a range of 30° to 90° from the vertical direction to provide an installation angle of the second support 4.

Figure 9:
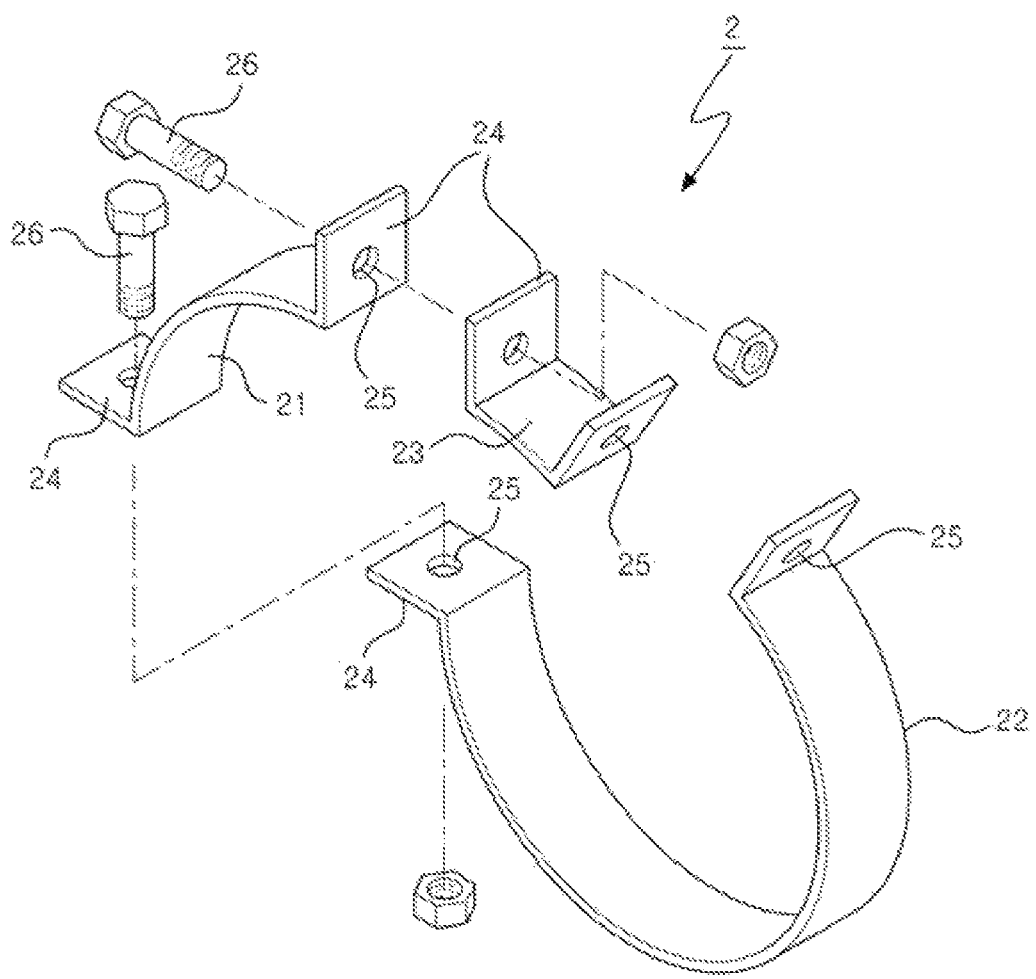
FIG. 9 is an exploded perspective view showing still another example of a clamp member which may be applied to the present invention.

FIG. 9 is an exploded perspective view showing still another example of a clamp member which may be applied to the present invention.

A clamp member shown in FIG. 9 is constituted by three members as a configuration which may be selectively applied to FIGS. 4, 5, and 7 above. That is, the clamp member 2 is constituted by a first member 21 formed in a quarter-arc shape, a second member 22 in an arc shape at an angle of 210° to 240°, and a third member 23 formed at an angle of 30° to 60° from a vertical direction.

As shown in FIG. 9, shapes of the first member 21 and the second member 22 are different from those of the clamp member 4 in FIG. 4, in which a portion where the first member 21 and the second member 22 are coupled to each other is located perpendicularly to a portion where the first member 21 and the third member 23 are coupled to each other.

Such a configuration is to prevent the portion where the first member 21 and the second member 22 are coupled to each other from interfering from a ceiling when a space between the slab 300 and the ceiling is applied to a narrow place like an apartment house.

Figure 10:
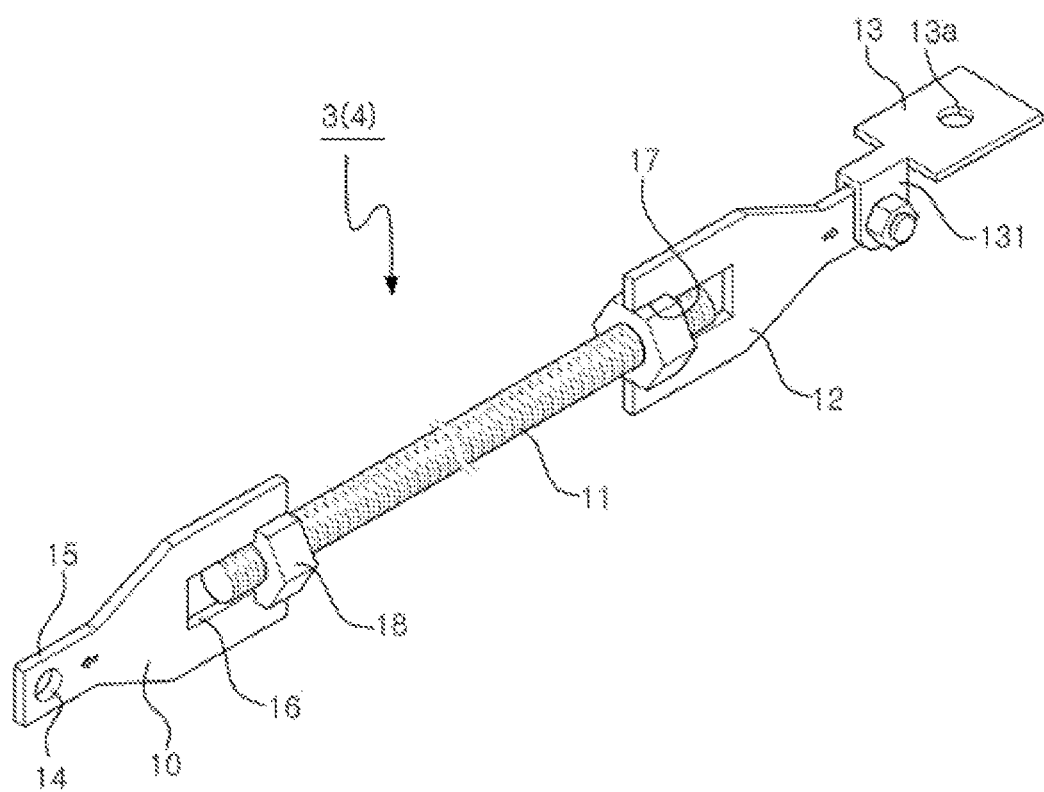
FIG. 10 is a perspective view showing a preferred example of first and second supports which may be applied to the present invention.
Figure 11:
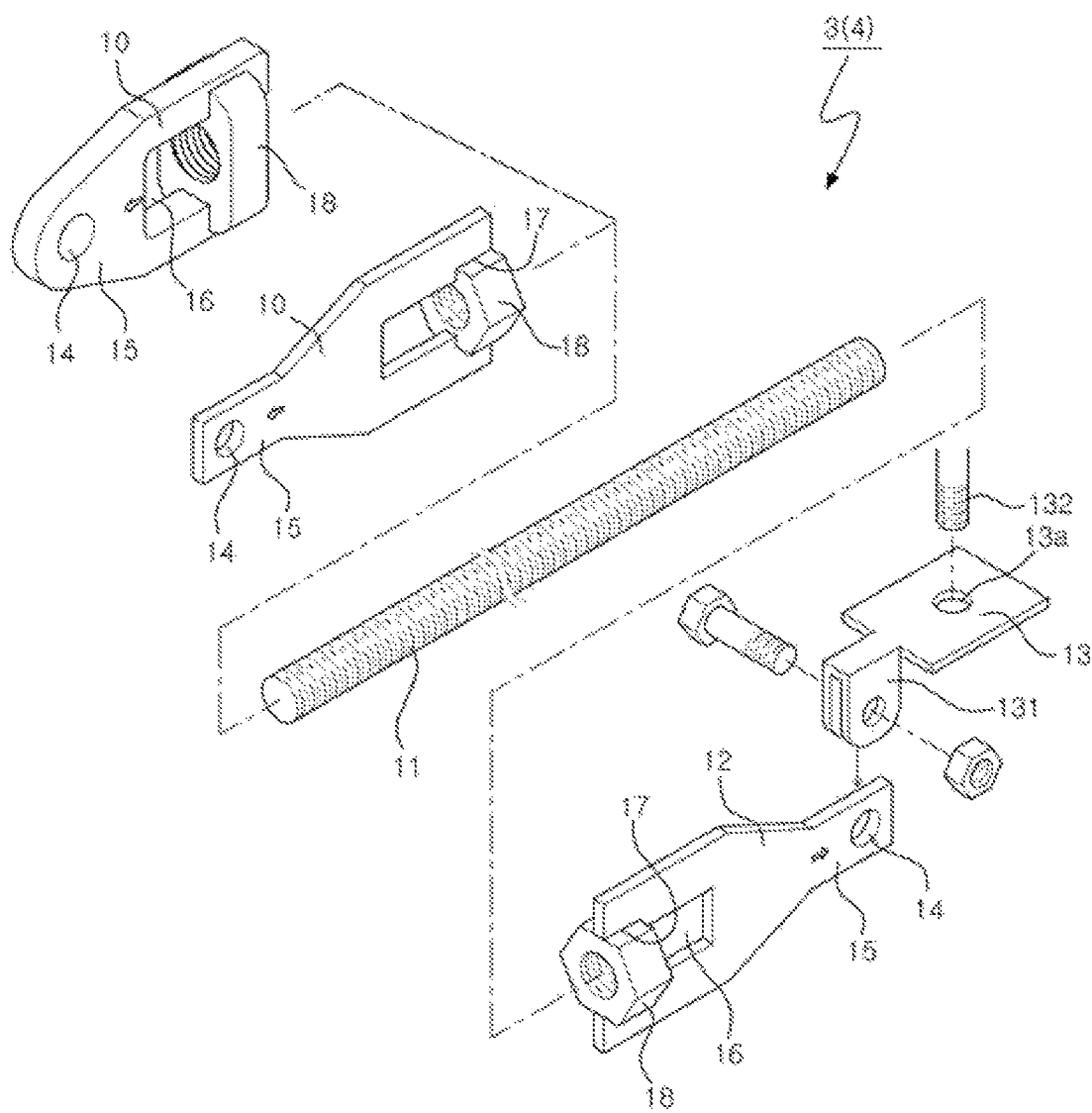
FIG. 11 is an exploded perspective view showing a configuration of a lower fixing member which is applied to the first and second supports of the present invention.
Figure 12:
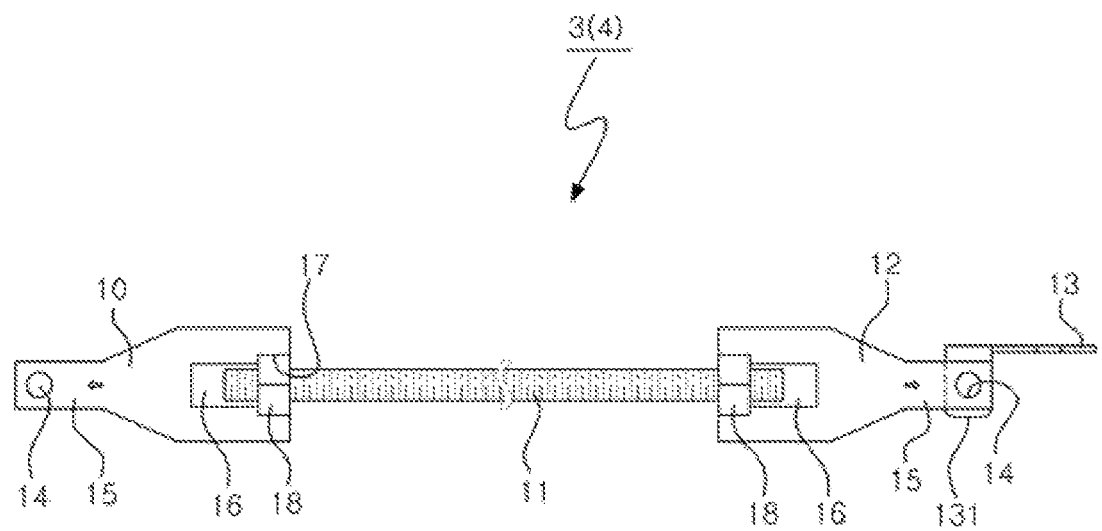
FIG. 12 is a front view of the first and second supports of the present invention.

FIG. 10 is a perspective view showing a preferred example of first and second supports which may be applied to the present invention, FIG. 11 is an exploded perspective view showing a configuration of a lower fixing member which is applied to the first and second supports of the present invention, and FIG. 12 is a front view of the first and second supports of the present invention.

The first and second supports 3 and 4 provided in the device 1 for supporting a horizontal pipe in four directions of the present invention are provided as a configuration including a lower fixing member 10 coupled with the clamp member 2, a screw rod 11 screw-coupled to the lower fixing member 10, an upper fixing member 12 screw-coupled to an upper end of the screw rod 11, and a bracket 13 fixed to the slab 300 to which the upper fixing member 12 is coupled.

The lower fixing member 10 and the upper fixing member 12 may be provided as the same configuration, and this configuration is constituted as a configuration in which a steel plate is cut by pressing to be coupled between the flanges 24 at one side, a coupling piece 15 formed with a coupling hole 14 communicating with a fixing hole 25 formed in the flange 24 is formed, a nut insertion groove 17 is formed at an opposite side of the coupling piece 15 to form an adjustment space 16 inwardly to be fixed using a nut 28 to which the screw rod 11 is to be assembled.

In the case of constituting the lower fixing member 10 and the upper fixing member 12 as such a configuration, low-price manufacturing is possible, and lengths of the first and second supports 3 and 4 may be variously adjusted by a method of adjusting the length of the screw rod 11.

The bracket 13 has a configuration in which at least one or more bolt holes 13a assembling an anchor bolt fixed to the slab 300 are formed and a fixing piece 131 fixing the coupling piece 15 of the upper fixing member 12 is formed.

The screw rod 11 may be applied with a ready-made thread bolt when considering productivity and the like.

Figure 13:
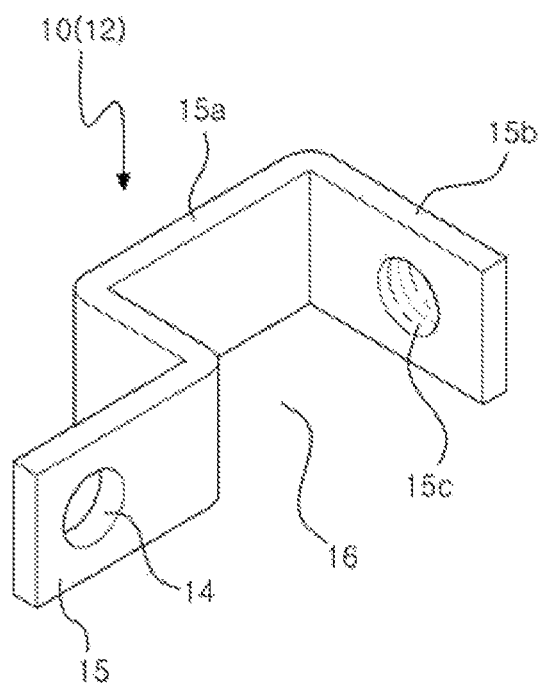
FIGS. 13 and 14 are perspective views showing other examples of a lower fixing member and an upper fixing member which may be applied to the first and second supports of the present invention.
Figure 14:
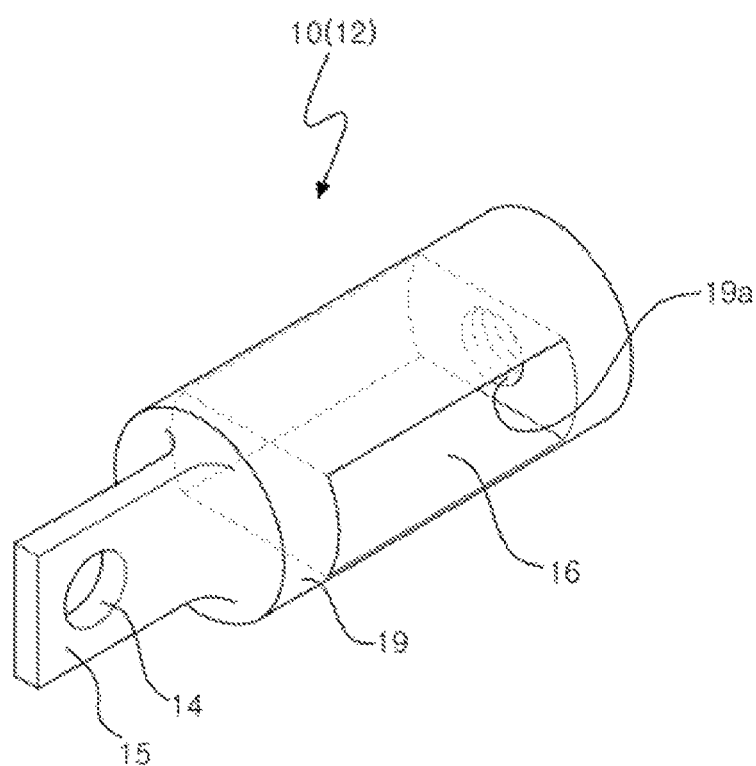

FIGS. 13 and 14 are perspective views showing other examples of a lower fixing member and an upper fixing member which may be applied to the first and second supports of the present invention.

The lower fixing member 10 and the upper fixing member 12 which are applied to the first and second supports 3 and 4 of the present invention are formed by bending a flat steel, as a configuration that as shown in FIG. 12, a connection piece 15a is bent and formed so that an adjustment space 16 is formed below the coupling piece 15, and a screw-rod coupling plate 15b formed with a screw hole 15c is bent and formed below the connection piece 15a to be located on the same axis as the coupling piece 15.

FIG. 14 may be provided by die casting and the like, and shows a configuration that a body 19 is integrally formed above the coupling piece 15, an adjustment space 16 is formed through the body 19 in an axially perpendicular direction, and a screw hole 19a is formed at an upper end of the body 19 to communicate with the adjustment space 16.

As shown in FIGS. 13 and 14, in the case of providing the lower fixing member 10 and the upper fixing member 12, manufacturing is possible without an inconvenient process of welding and fixing the nut 18.

FIGS. 15 to 19 are enlarged perspective views showing first to fifth examples of a state where a stopper means is applied while the lower fixing member is coupled to the clamp member of the present invention.

In the present invention, when the lower fixing member 10 is coupled to the clamp member 2, the lower fixing member 10 includes a stopper means 30 to provide an inclined angle of 30° or more, and a display means 40 includes an angle display portion 41 to allow an operator to easily check an installation angle of the support.

In the display means 40, as shown in FIGS. 1 to 5, the angle display portion 41 is formed selectively at any one of the flanges 24 coupling the first member 21 and the third member 23 and any one of the flanges 24 coupling the second member 22 and the third member 23 and an indicator 42 corresponding to the angle display portion 41 is formed at the lower fixing member 10 to provide an installation angle.

The angle display portion 41 and the indicator 42 are formed in a concave to be pressed, and the angle display portion 41 is marked at intervals of 5° to 10° in a range of 30° to 90° to adjust the installation angle of the first and second supports 3 and 4 at various angles.

Meanwhile, the display means 40 is formed at the fixing piece 52 constituting the fixture 5 to be applied to the fixture 5 as shown in FIG. 6 or formed at the flange 24 as shown in FIG. 7.

Further, the display means 40 is formed at a member that may be easily checked with naked eyes by the operator.

In addition, the stopper means 30 is constituted by various configurations as shown in FIGS. 15 to 19 to prevent the lower fixing member 10 from being installed at an inclined angle of 30° or less.

The stopper means 30 may be applied to the flanges 24 coupling the first member 21 and the third member 23 and the flanges 24 coupling the second member 22 and the third member 23 or applied to the fixture 5 coupled to the flanges 24.

Figure 15:
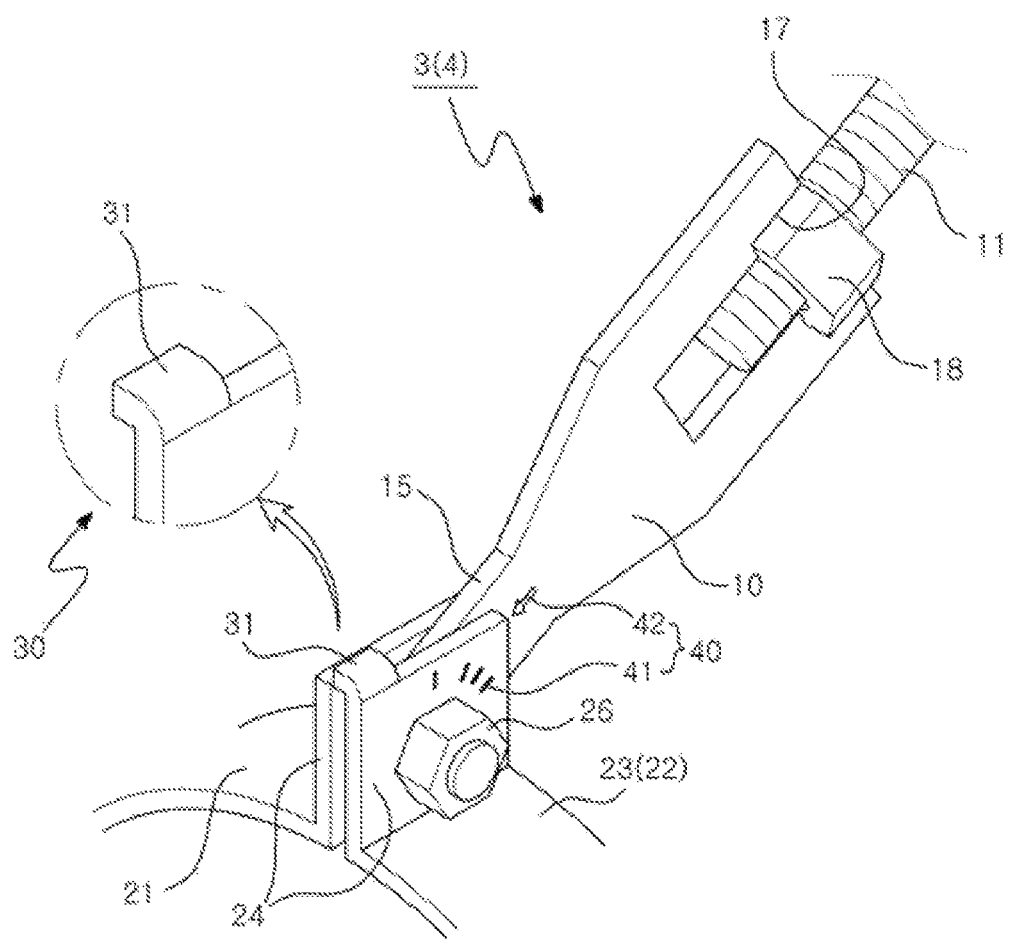
FIG. 15 is an enlarged perspective view showing a first example in a state where a stopper means is applied while a lower fixing member is coupled to the clamp member of the present invention.

As a first example of the stopper means 30, as shown in FIG. 15, a locking step 31 is formed to be bent downwardly while protruding outwardly at an upper portion of any one of the flanges 24 coupling the first member 21 and the third member 23 and any one of the flanges 24 coupling the second member 22 and the third member 23 to prevent the lower fixing member 10 from being coupled to be rotated at 30° or less from the vertical direction.

Figure 16:
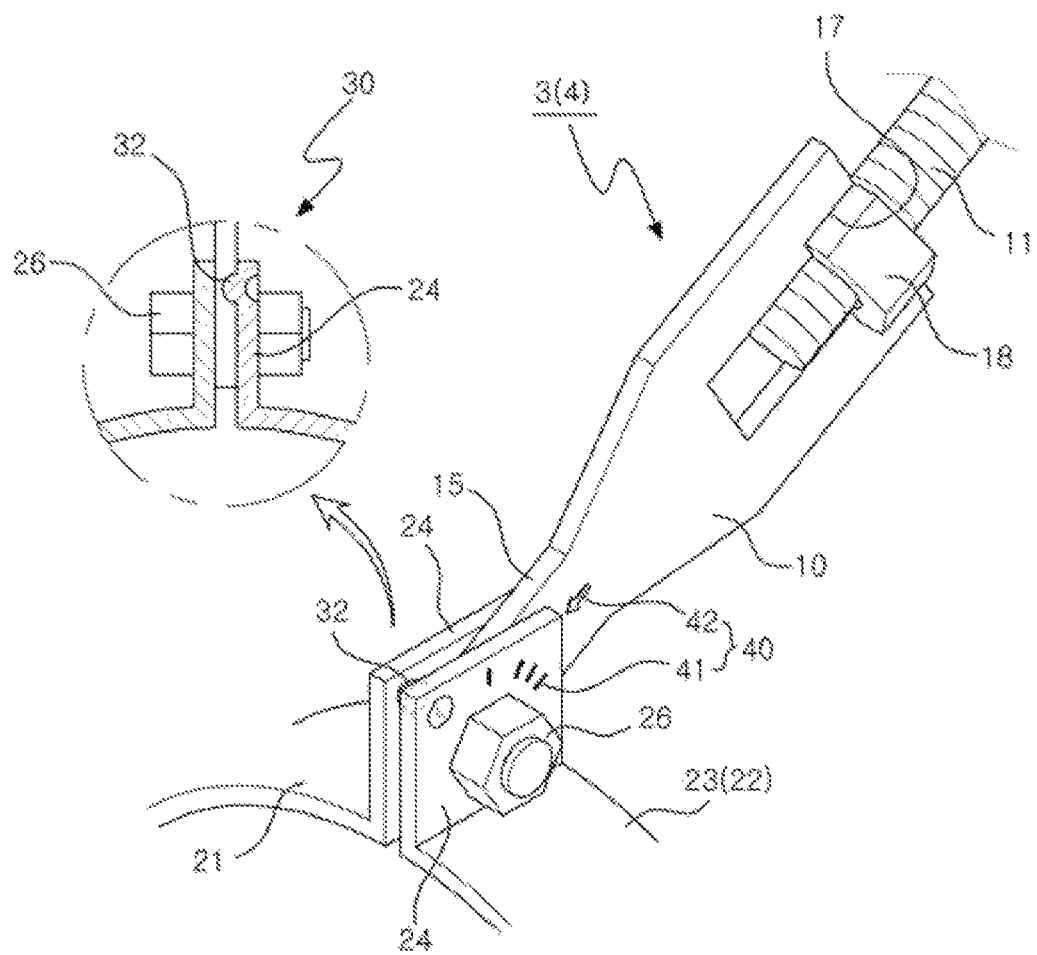
FIG. 16 is an enlarged perspective view showing a second example in a state where a stopper means is applied while a lower fixing member is coupled to the clamp member of the present invention.

As a second example of the stopper means 30, as shown in FIG. 16, a locking protrusion 32 is formed to protrude inwardly by being pressed to any one of the flanges 24 coupling the first member 21 and the third member 23 and any one of the flanges 24 coupling the second member 22 and the third member 23 to prevent the lower fixing member 10 from being coupled to be rotated at 30° or less from the vertical direction.

Figure 17:
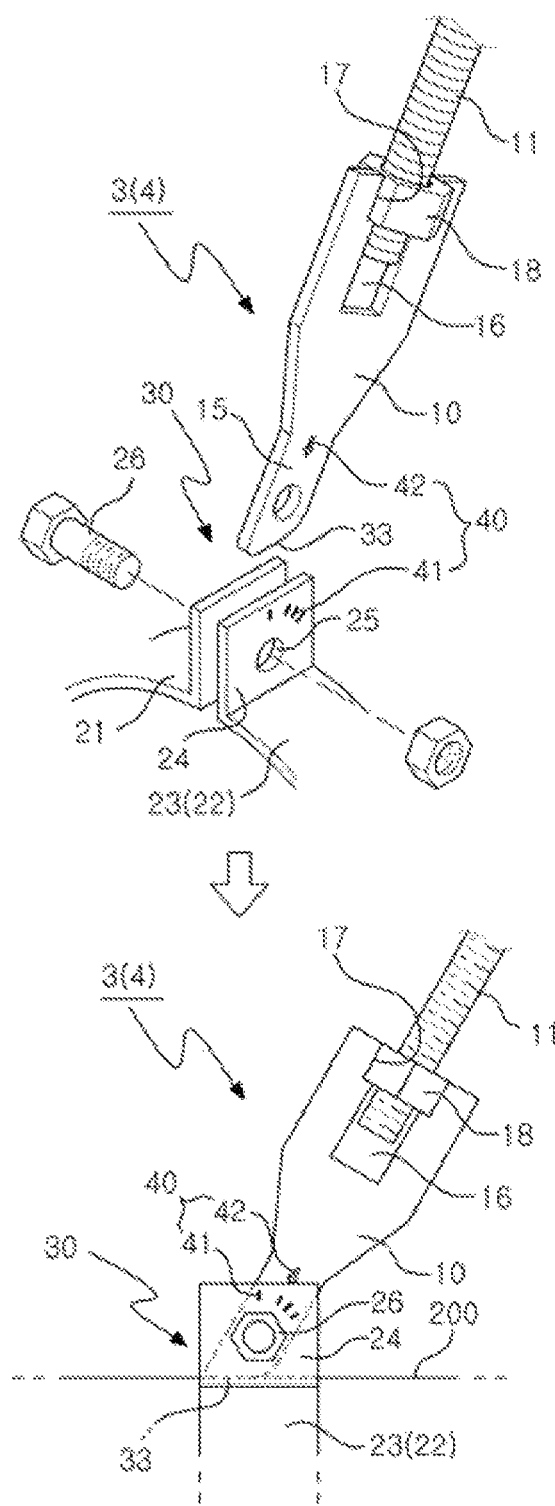
FIG. 17 is an enlarged perspective view showing a third example in a state where a stopper means is applied while a lower fixing member is coupled to the clamp member of the present invention.

As a third example of the stopper means 30, as shown in FIG. 17, a flat portion 33 is formed to support a lower surface of the coupling piece 15 of the lower fixing member 10 at an angle of 30° from the vertical direction by coming into a contact with the pipe 200 to prevent the lower fixing member 10 from being coupled to be rotated at 30° or less.

Figure 18:
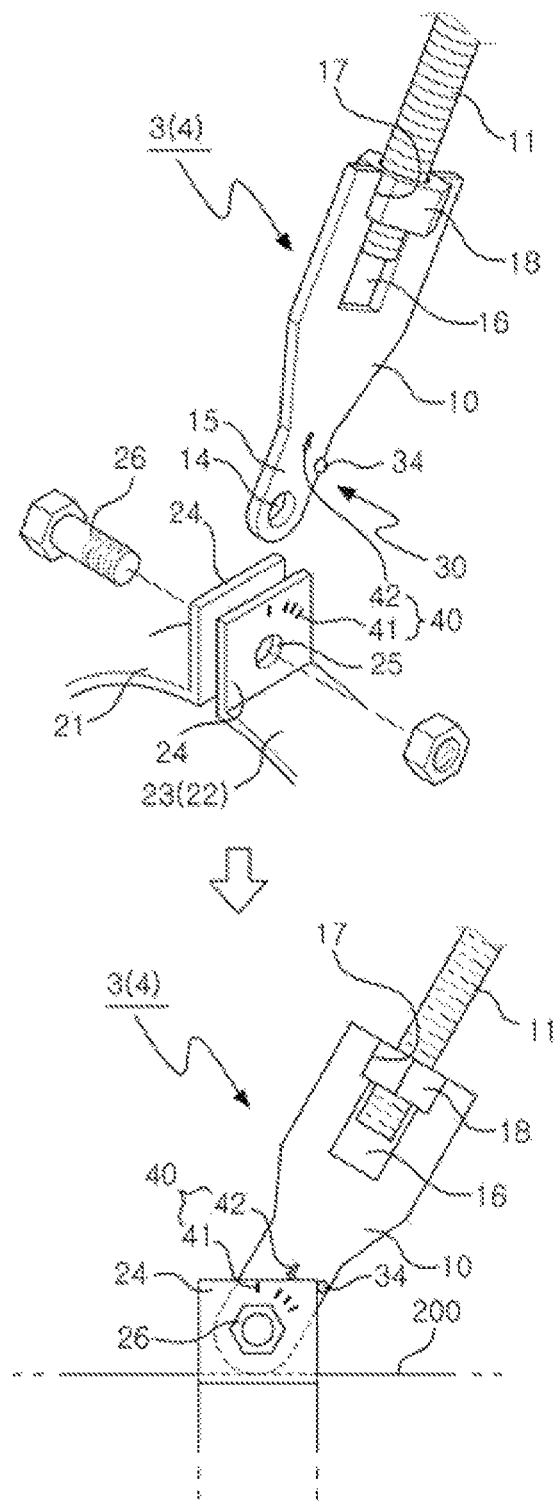
FIG. 18 is an enlarged perspective view showing a fourth example in a state where a stopper means is applied while a lower fixing member is coupled to the clamp member of the present invention.

As a fourth example of the stopper means 30, as shown in FIG. 18, a locking protrusion 34 is formed to protrude to a middle one side of the coupling piece 15 provided in the lower fixing member 10 to prevent the lower fixing member 10 from being coupled to be rotated at 30° or less.

Figure 19:
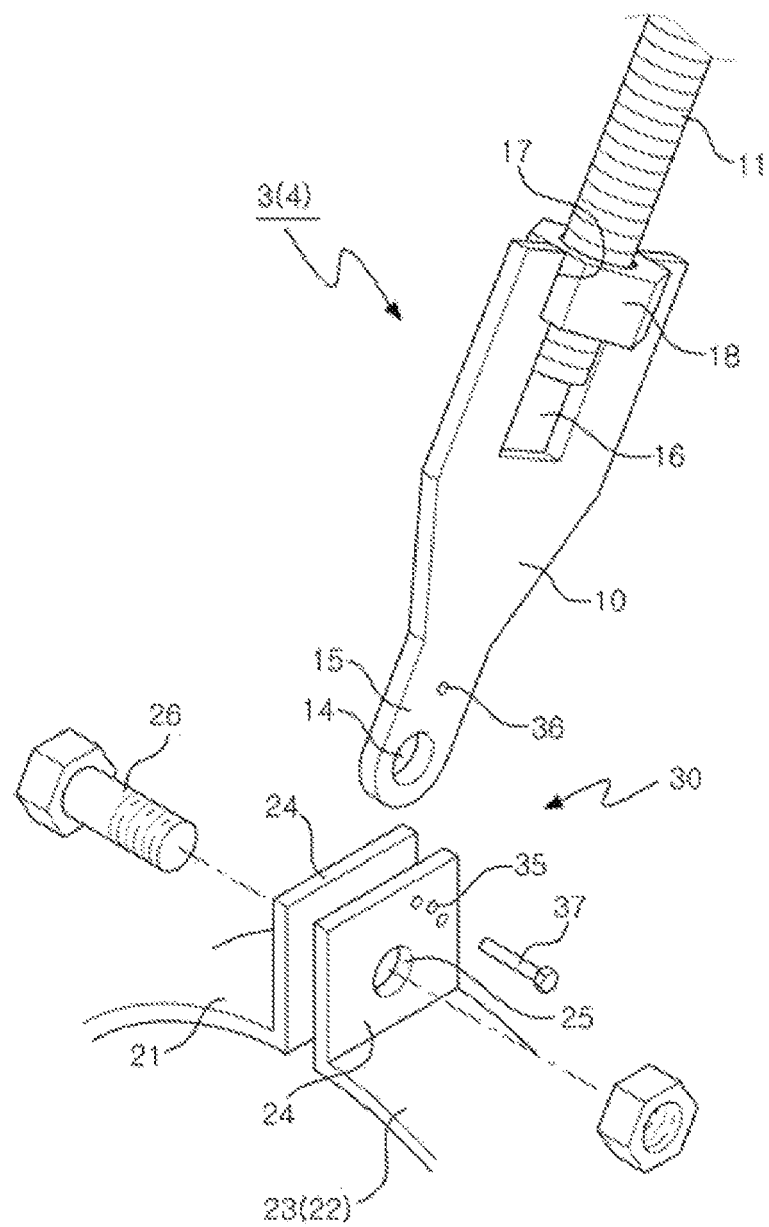
FIG. 19 is an enlarged perspective view showing a fifth example in a state where a stopper means is applied while a lower fixing member is coupled to the clamp member of the present invention.

As a fifth example of the stopper means 30, as shown in FIG. 19, a plurality of angle adjustment holes 35 are formed at the flanges 24 coupling the first member 21 and the third member 23 and the flanges 24 coupling the second member 22 and the third member 23 and a fixing hole 36 is formed on a central line of the lower fixing member 10 to communicate with any one of the angle adjustment holes 35 formed in the flange 24, so that the angle adjustment hole 35 and the fixing hole 36 may be fixed to each other by a fixing pin 37. At this time, the angle adjustment holes 35 are formed at locations where the first and second supports 3 and 4 are installed to be inclined at 30°, 45°, and 60° on the vertical line with the pipe 200, respectively, so that the first and second supports 3 and 4 may be installed to be inclined at 30°, 45°, and 60°.

Further, although not separately shown in the present invention, it is natural that the stopper means 30 constituted as shown in FIGS. 15, 16, and 17 may be applied even to the fixing piece 52 of the fixture 5 coupled to the second member 22.

In the case of using the device 1 for supporting the horizontal pipe in four directions of the present invention configured as such, the first and second supports 3 and 4 acting in an axial (longitudinal) direction and an axially perpendicular (transverse) direction may be installed in one clamp member 2 together so as to simplify the configuration and particularly, to manufacture and distribute the first and second supports 3 and 4 at a low price.

Further, when coupling the clamp member 2 to the first and second supports 3 and 4, the supports may be installed at various angles using the display means 40 and the stopper means 30, and the installation is impossible at an angle of 30° or less from the vertical direction which is limited in the Fire Services Art, thereby solving the problems due to poor installation.

Figure 20:
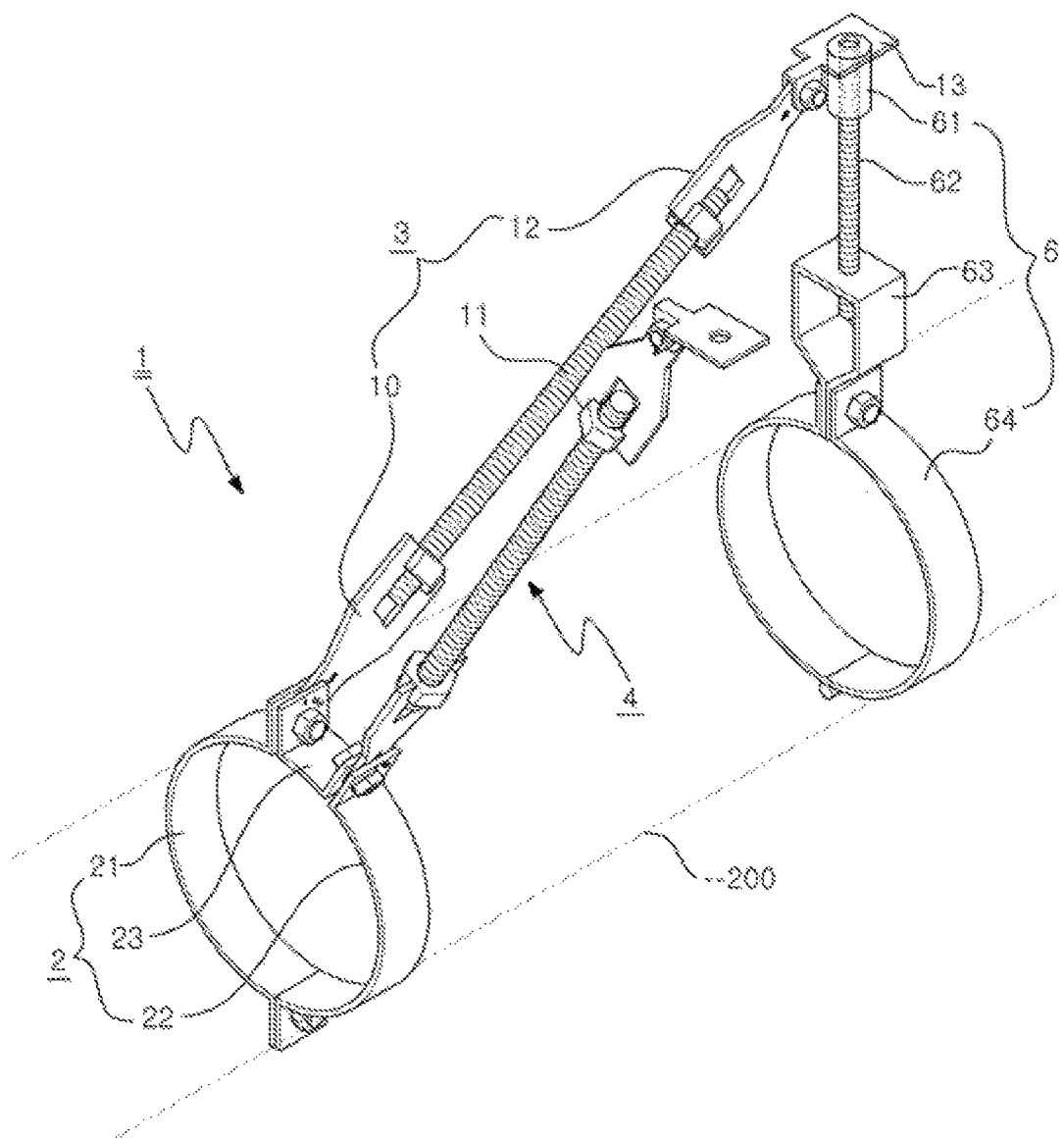
FIG. 20 is a perspective view showing a state where a hanger is applied to a first support of the present invention.
Figure 21:
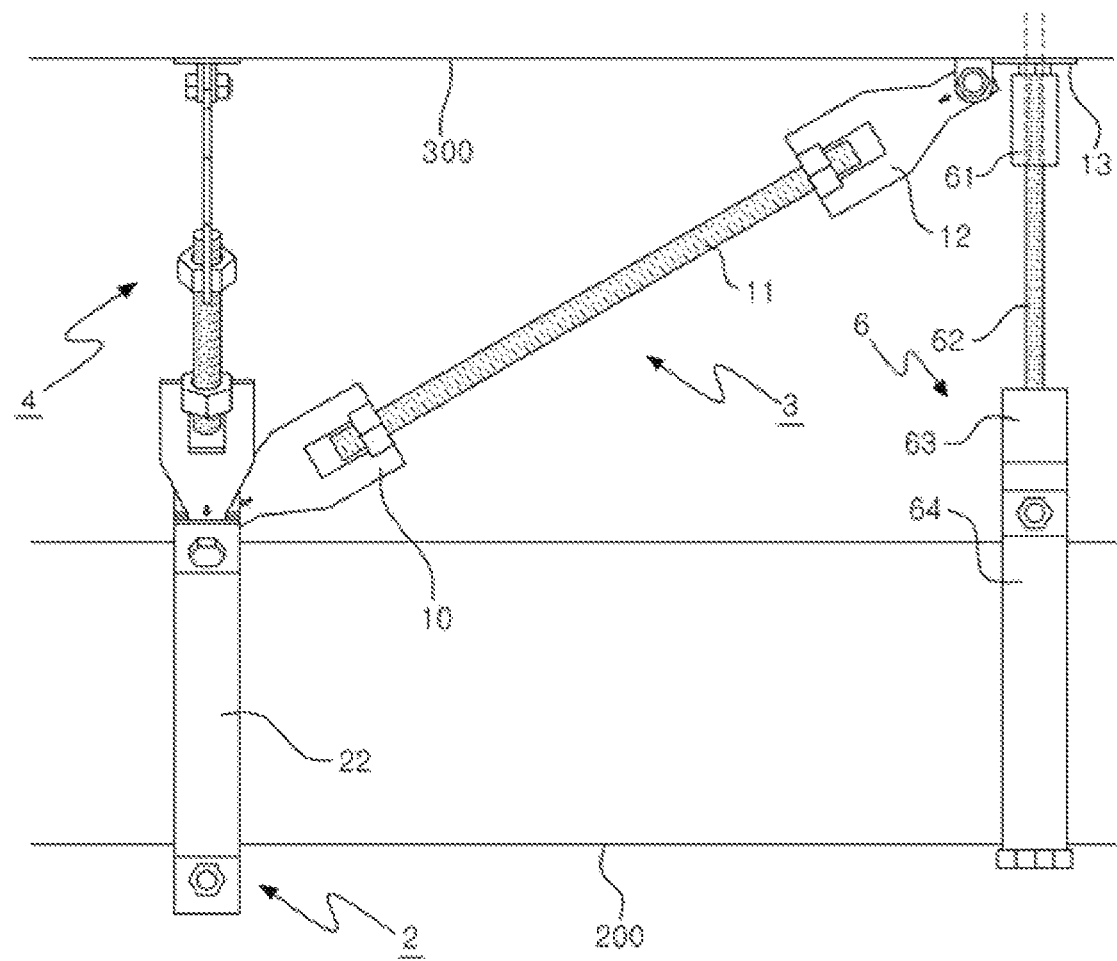
FIG. 21 is a front view of FIG. 20.

FIG. 20 is a perspective view showing a state where a hanger is applied to a first support of the present invention and FIG. 21 is a front view of FIG. 20.

Before the first support 3 provided in the present invention is installed, the hanger 6 is provided to hang the pipe 200, thereby securing workability in a narrow space and reducing a process of installing the supports and the hanger 6 doubly.

That is, in the present invention, a pair of fixing pieces 131 coupled with the upper fixing member 12 are bent and integrally formed at the bracket 13 constituting the first support 3, a socket type nut 61 is coupled to an anchor bolt 132 fixing the bracket 13, and the hanger 6 is installed at the socket type nut 61.

The hanger 6 is constituted by a configuration including a screw rod 62 coupled to the socket type nut 61, a connector 63 coupled to a lower end of the screw rod 62, and a clip 64 coupled to a lower end of the connector 63 to clamp the pipe 200.

The hanger 6 is a constituted member which hangs simply the pipe 200 to conveniently perform an operation, and the hanger 6 is removed while the pipe 200 is installed or the hanger 6 is installed as it is by using the present invention, thereby reducing a process of installing doubly the first and second supports 3 and 4 in an axial (longitudinal) direction or an axially perpendicular (transverse) direction after installing the general hanger 6.

In the case of using the hanger 6, particularly, the hanger 6 is used for a ceiling and the like of the apartment house having a narrow operation space at the lower side of the slab 300 to provide a functionality to facilitate the installation of the pipe 200.

Figure 22:
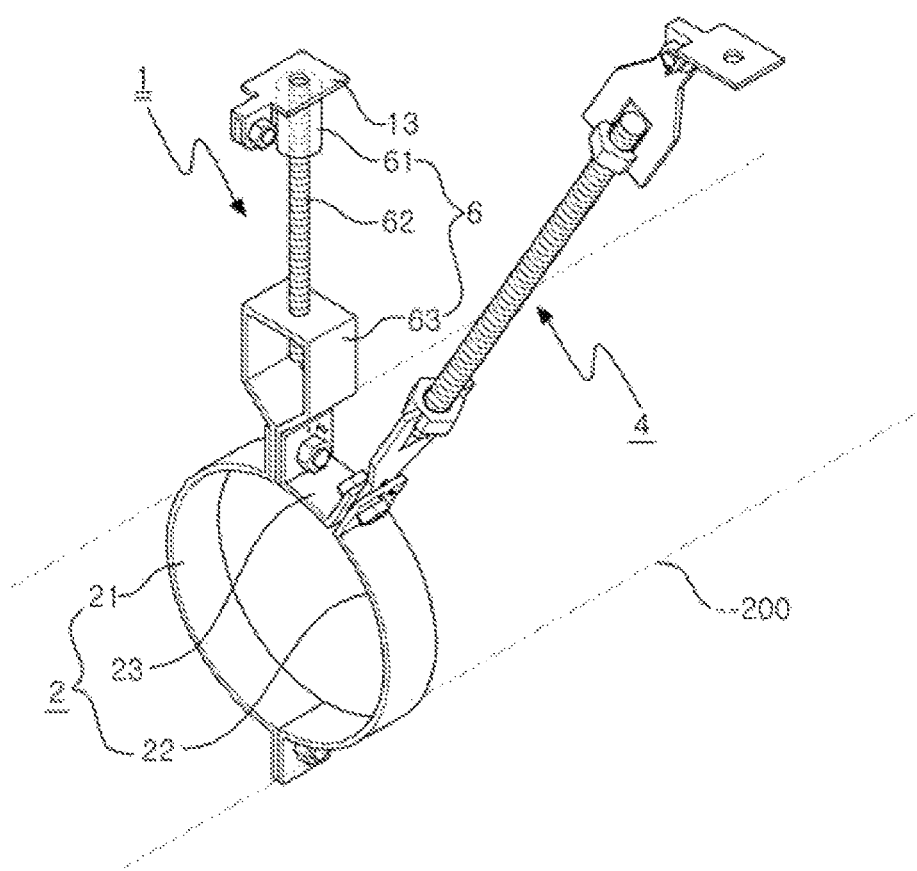
FIG. 22 is a perspective view showing a state where a hanger is applied while only a second support is applied to the clamp member of the present invention.

FIG. 22 is a perspective view showing a state where a hanger is applied while only a second support is applied to the clamp member of the present invention.

As shown in FIG. 22, the clamp member 2 is constituted by a first member 21 formed in a quarter-arc shape, a second member 22 formed in an arc shape at an angle of 210° to 240°, and a third member 23 formed at an angle of 30° to 60° from a vertical direction.

When configuring the clamp member 2 constituted above, a second support is applied as a connection portion of the second member 22 and the third member 23, and a hanger 6 is applied to a connection portion of the first member 21 and the second member 22.

The hanger 6 is constituted by a configuration including a socket type nut 61 coupled to an anchor bolt 132 fixed to the slab 300, a screw rod 62 coupled to the socket type nut 61, and a connector 63 coupled to a lower end of the screw rod 62 and having a lower end formed at the connection portion of the first member 21 and the second member 22.

The configuration shown in FIG. 22 is to provide a functionality of solving inconvenience of installing the hanger 6 separately when only the second support 4 is applied to the clamp member 2.

Figure 23:
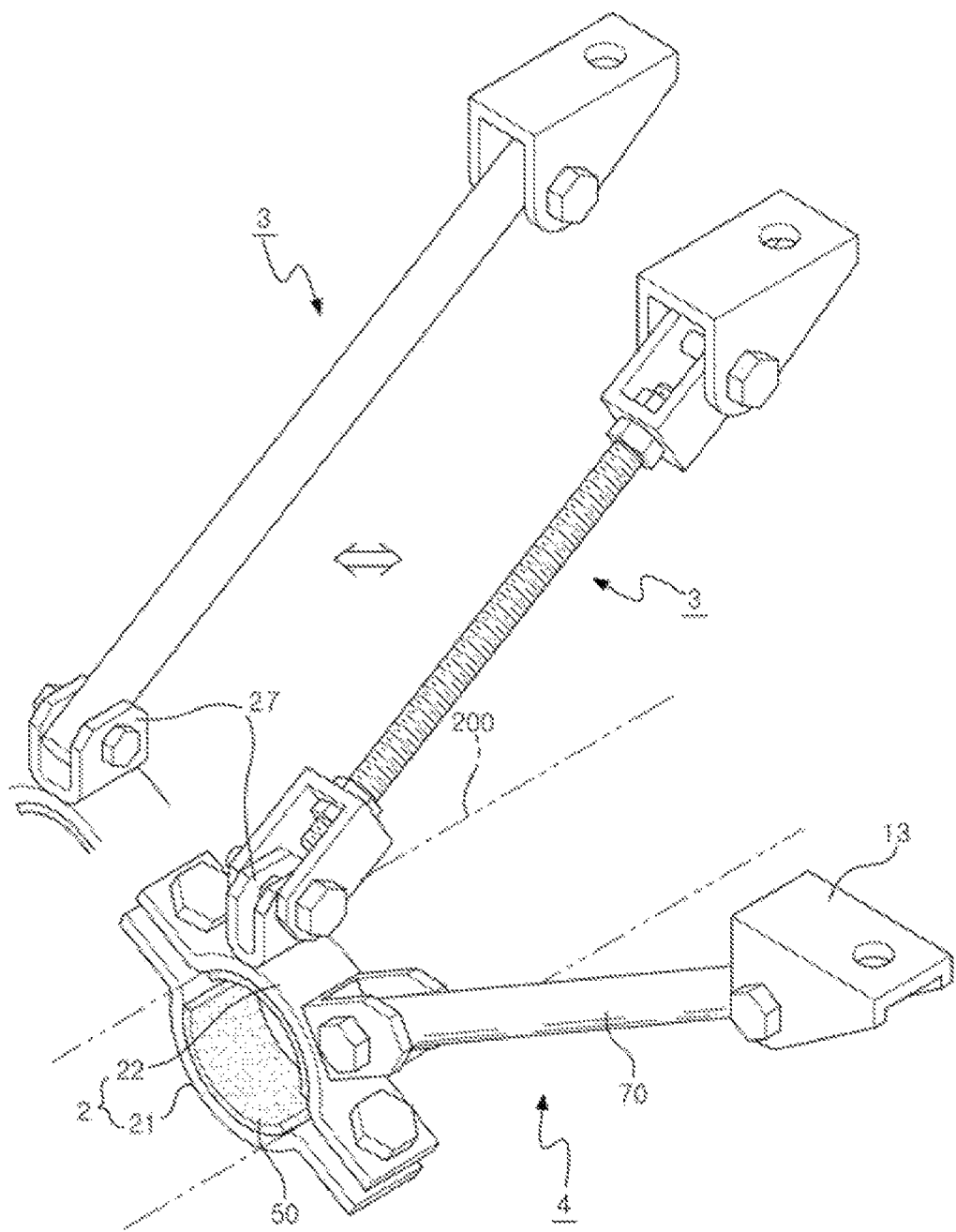
FIG. 23 is a perspective view showing still another example of a clamp member which may be applied to the present invention.

FIG. 23 is an exploded perspective view showing yet another example of a clamp member which may be applied to the present invention.

A clamp member 2 shown in FIG. 23 is mainly developed to be used at a place (apartment, etc.) where a height between the slab 300 and the ceiling is low and formed by a combination of the first member 21 and the second member 22 formed in semi-arc shapes. At this time, when the flanges 24 are attached to any one or both of the first member 21 and the second member 22 at an angle of 30° to 60° from the vertical direction, unlike FIG. 7, a configuration in which the flanges 24 face in a circumferential direction is provided.

The flange 24 is provided with one or a pair, and in the present invention, there is provided that a pair of flanges is constituted. As shown in FIG. 23, a configuration in which a steel plate is bent in a ⊔ shape to fix a connection portion side to the first member 21 or the second member 22 by a method such as welding is provided and the flanges 24 are constituted by a configuration having inclined surfaces 24a at an angle of 30° or 45° at both upper sides which are opening sides.

The connection portion of the flange 24 is constituted to meet a width of the clamp member 2 or have a smaller width than the width of the clamp member 2.

In addition, a buffer material 50 made of a rubber material and the like is additionally constituted on inner peripheral surfaces of the first member 21 and the second member 22 constituting the clamp member 2. The buffer material 50 can be used commonly for the clamp members 2 of the various examples.

As such, when the flanges 24 are applied in a circumferential direction, the shear force may be increased due to tension provided by the second support 4 to provide the clamp member 2 of a rigid configuration without a problem such that the flange 24 and the clamp member 2 are deformed in use.

Further, in the first member 21 or the second member 22 formed with the flange 24, a hanger-combined flange 27 is further installed at a location distorted from the flange 24 at an angle of 30° to couple the first support 3 of the hanger 6.

Figure 24:
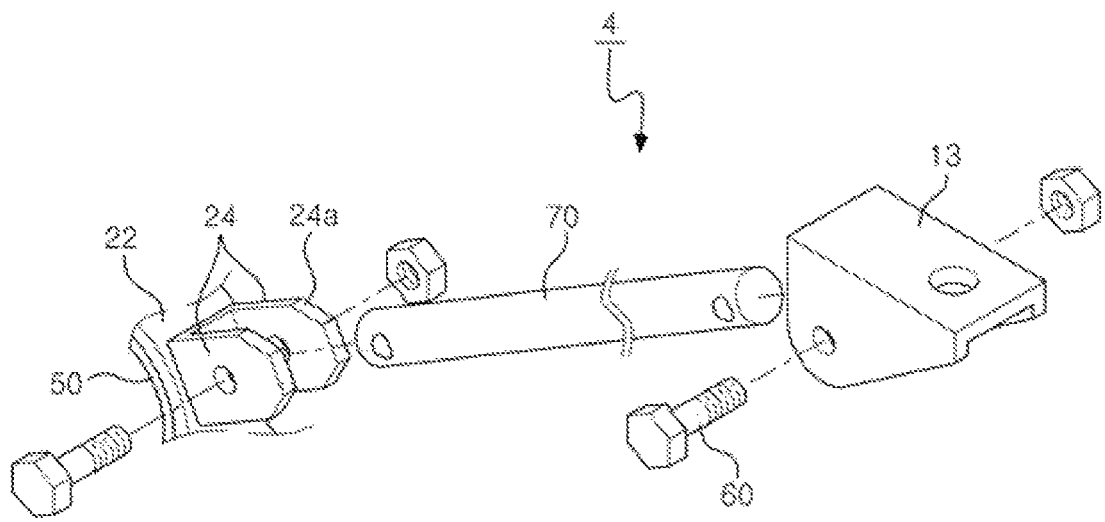
FIG. 24 is a perspective view showing a preferred example of a second support which may be applied to FIG. 23.
Figure 25:
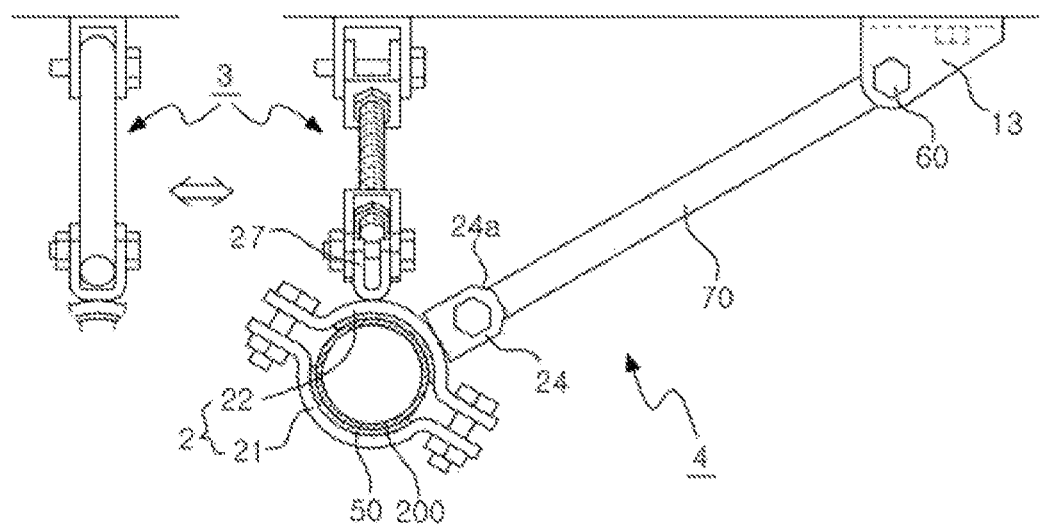
FIG. 25 is a front view showing a use example of the second support provided in FIG. 24.

FIG. 24 is a perspective view showing a preferred example of a second support which may be applied to FIG. 23 and FIG. 25 is a front view showing a use example of the second support provided in FIG. 24.

As shown in FIGS. 24 and 25, the second support is a configuration in which an upper end is coupled by a fixing means 60 consisting of a bolt and a nut to be rotatable on the bracket 13 fixed to the slab 300, and a lower end is coupled by the fixing means 60 consisting of a bolt and a nut to be rotatable on the flange 24 constituted by bending a steel plate in a ⊔ shape.

This is to cut a pipe 70 serving as a support at an appropriate length and perforate only a hole capable of assembling the fixing means 60 at both ends, thereby providing a functionality capable of maximizing a support capacity while simplifying the configuration.

Figure 26A:
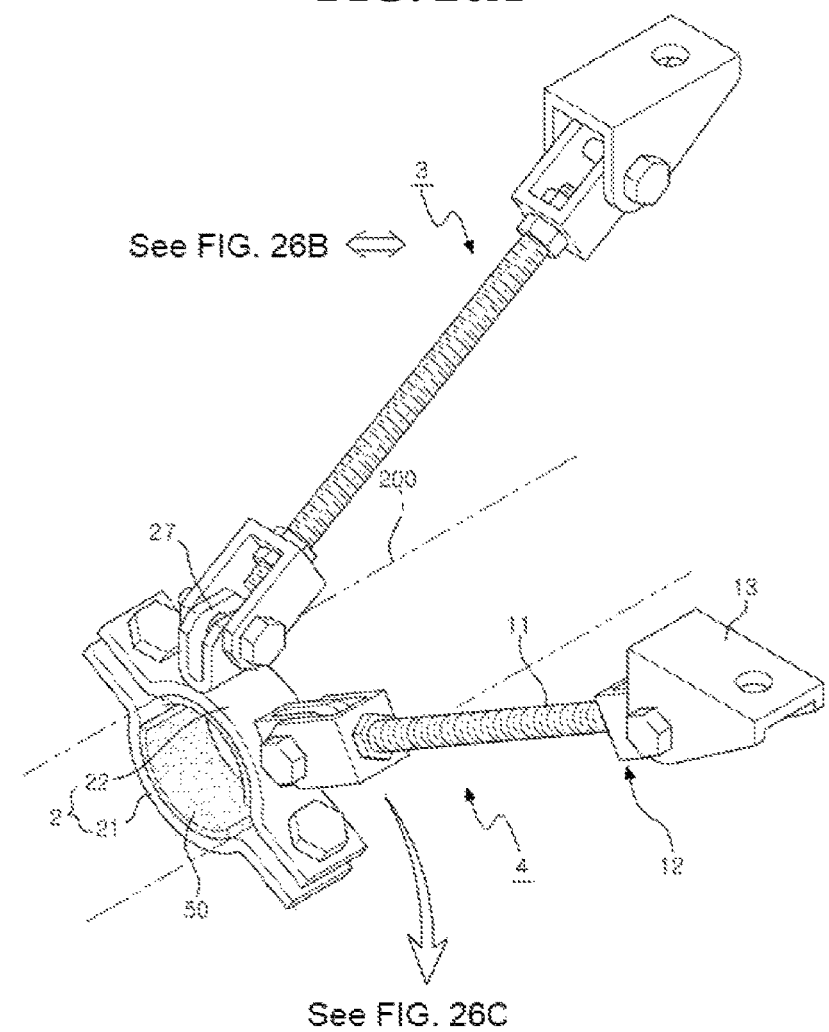
FIGS. 26A, 26B, and 26C are perspective views showing another preferred example of the second support which may be applied to FIG. 23.
Figure 26B:
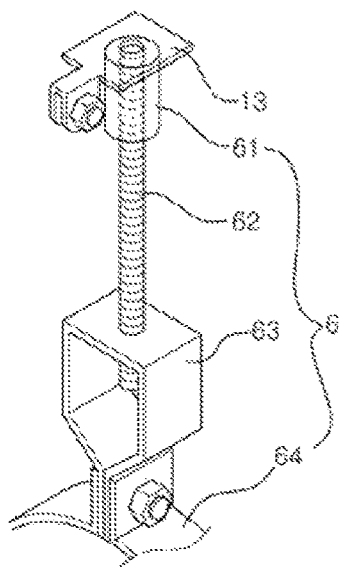
Figure 26C:
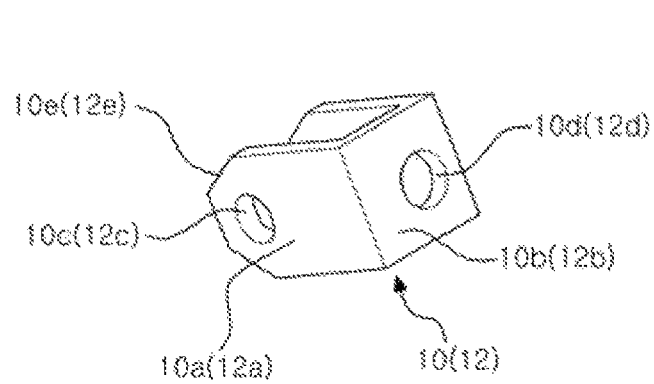
Figure 27:
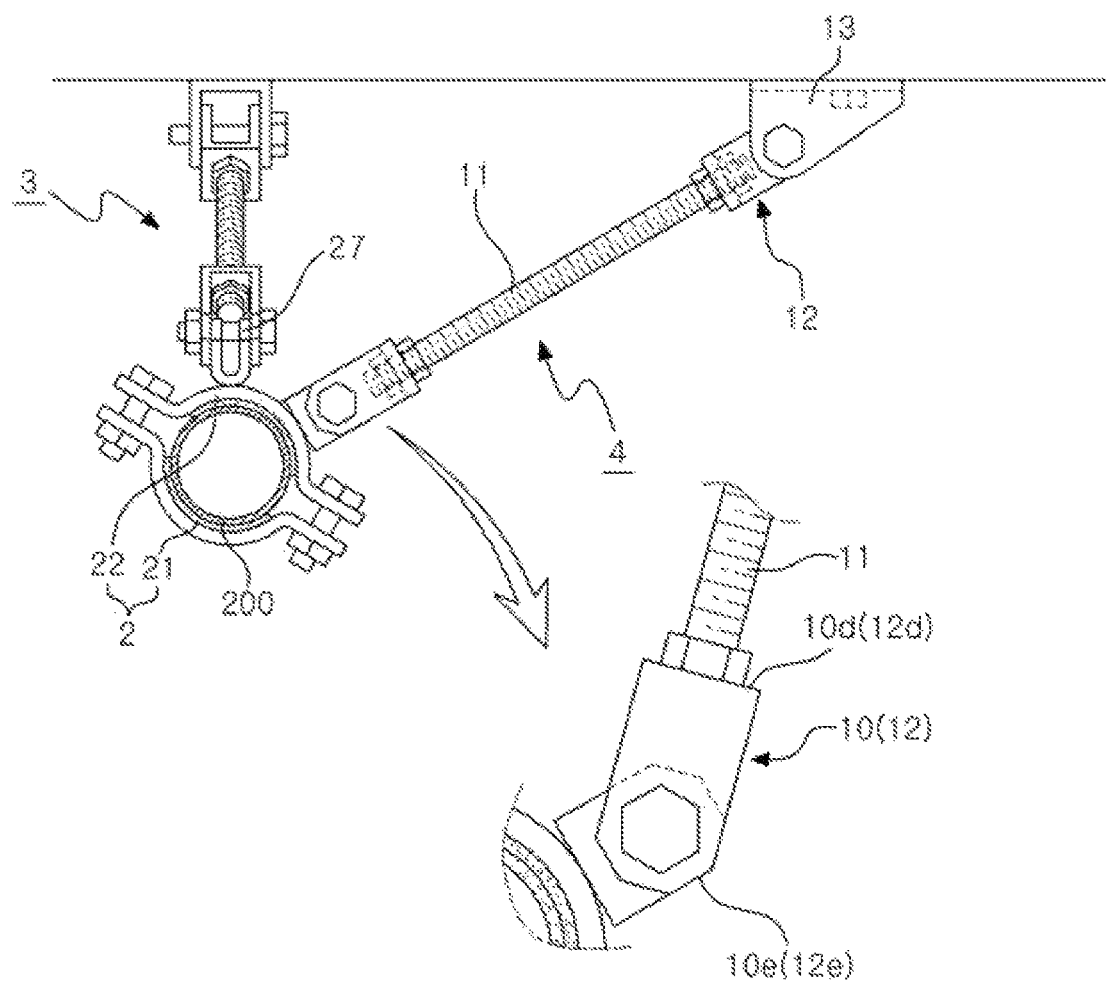
FIG. 27 is a front view showing a use example of the second support provided in FIGS. 26A, 26B, and 26C.

FIGS. 26A, 26B, and 26C are perspective views showing another preferred example of the second support which may be applied to FIG. 23 and FIG. 27 is a front view showing a use example of the second support provided in FIGS. 26A, 26B, and 26C.

A second support 4 provided in FIGS. 25 and 27 is constituted as a configuration including an inner side or outer side of a flange 24 constituted by bending the steel plate provided in FIG. 23 in a ⊔ shape, a lower fixing member 10 and an upper fixing member 12 which are coupled to a bracket 13 fixed to a slab 300, a screw rod 11 connecting the lower fixing member 10 and the upper fixing member 12 to each other, and a nut 18 fastened to the screw rod 11.

The lower fixing member 10 and the upper fixing member 12 are constituted by configuration including a pair of fixing plates 10a and 12a facing each other and connection plates 10b and 12b connecting one sides of these fixing plates 10a and 12a, in which fixing holes 10c and 12c are formed in the fixing plates 10a and 12a at both sides to couple the fixing means 60 consisting of a bolt and a nut by communicating with the hole formed in the flange 24, and screw-rod assembly holes 10d and 12d to which the screw rod 11 is inserted are formed in the connection plates 11b and 12b. The lower fixing member 10 and the upper fixing member 12 are constituted by bending the steel plate in a ⊔ shape like the flange 24.

In addition, like the upper end of the flange 24, in the fixing plates 10a and 12a, inclined surfaces 10e and 12e at an angle of 30° or 45° are formed at both upper ends which are opening sides.

As described above, in the case of constituting the second support 4, adjustment of an angle between the flange 24 and the lower fixing member 10 may be performed at 30°, 45°, and 60° without a separate display means.

In other words, like the example of the present invention, when the flange 24 and the fixing piece 10a of the lower fixing member 10 coincide with each other, the second support 4 is installed at an angle of 30°. When the inclined surfaces 24a and 10e formed on the flange 24 and the fixing piece 10a of the lower fixing member 10 coincide with each other, the second support 4 is installed at 45°.

In the detailed description of the present invention, specific embodiments are described, but various modifications are possible within limits without departing from the scope of the present invention. Therefore, the scope of the present invention should not be limited to the embodiments and should be defined by the appended claims to be described below and equivalents to the appended claims.

The invention claimed is:

1. A supporting device for a horizontal pipe in four directions, comprising:
 a clamp member fixed while surrounding a pipe; and
 a first support and a second support which are coupled to a bracket of which one end is coupled to the clamp member and the other end is fixed to a slab,
 wherein the clamp member is constituted by a first member formed in a semi-arc shape and a second member to be horizontally assembled to each other, wherein flanges are integrally provided to be located at an axial side of the clamp member vertically in the first member located at the slab side,
 wherein the first support is installed to be inclined at an angle of 30° to 90° from a vertical direction to an axial direction of the pipe as a configuration fixed between flanges formed vertically to the first member and to the bracket fixed to the slab so as to withstand a horizontal earthquake load in the axial direction of the pipe,
 wherein the second support is installed to be inclined at an angle of 30° to 90° from a vertical direction to an axially perpendicular direction of the pipe as a configuration fixed to flanges coupling the first and second members to each other and to the bracket fixed to the slab so as to withstand a horizontal earthquake load in the axially perpendicular direction of the pipe,
 wherein the second support is constituted as a configuration including an inner side or outer side of the flange constituted by bending a steel plate in a  shape, a lower fixing member and an upper fixing member which are coupled to the bracket fixed to the slab, a screw rod connecting the lower fixing member and the upper fixing member to each other, and a nut fastened to the screw rod, and
 wherein inclined surfaces at an angle of 30° or 45° are formed at an upper end of the flange and both upper ends of the fixing plates constituting the lower fixing member and the upper fixing member.

2. The supporting device for a horizontal pipe in four directions of claim 1, wherein a buffer material made of a rubber material is additionally constituted on inner peripheral surfaces of the first member and the second member constituting the clamp member.

3. A supporting device for a horizontal pipe in four directions, comprising:
 a clamp member fixed while surrounding a pipe; and
 a first support and a second support which are coupled to a bracket of which one end is coupled to the clamp member and the other end is fixed to a slab,
 wherein the clamp member is constituted by a first member formed in a semi-arc shape and a second member to be horizontally assembled to each other, wherein flanges are integrally provided to be located at an axial side of the clamp member vertically in the first member located at the slab side,
 wherein the first support is installed to be inclined at an angle of 30° to 90° from a vertical direction to an axial direction of the pipe as a configuration fixed between flanges formed vertically to the first member and to the bracket fixed to the slab so as to withstand a horizontal earthquake load in the axial direction of the pipe,
 wherein the second support is installed to be inclined at an angle of 30° to 90° from a vertical direction to an axially perpendicular direction of the pipe as a configuration fixed to flanges coupling the first and second members to each other and to the bracket fixed to the slab so as to withstand a horizontal earthquake load in the axially perpendicular direction of the pipe, and
 wherein the supporting device further comprises:
 a hanger constituted by a socket type nut coupled to an anchor bolt fixing the bracket constituting the first support, a screw rod coupled to the socket type nut, a connector coupled to a lower end of the screw rod, and a clip coupled to a lower end of the connector to clamp the pipe.

4. The supporting device for a horizontal pipe in four directions of claim 1, wherein in any one of the flanges coupling the first member and the third member and any one of the flanges coupling the second member and the third member, an angle display portion is formed, and in the lower fixing member, a display means forming an indicator corresponding to the angle display portion is provided to precisely provide an installation angle of the first and second supports.

5. The supporting device for a horizontal pipe in four directions of claim 1, wherein in any one of the flanges coupling the first member and the second member and the flanges fixed to any one or both sides of the first and second members, an angle display portion is formed, and in the lower fixing member, a display means forming an indicator corresponding to the angle display portion is provided to precisely provide an installation angle of the first and second supports.

6. The supporting device for a horizontal pipe in four directions of claim 1, wherein in any one of the flanges coupling the first member and the third member and any one of the flanges coupling the second member and the third member, a stopper means is provided to prevent the lower fixing member from being installed at an inclined angle of 30° or less.

7. The supporting device for a horizontal pipe in four directions of claim 6, wherein the stopper means has a locking step formed to be bent downwardly while protruding outwardly at an upper portion of any one of the flanges coupling the first member and the third member and any one of the flanges coupling the second member and the third member to prevent the lower fixing member from being installed at an inclined angle of 30° or less from a vertical direction.

8. The supporting device for a horizontal pipe in four directions of claim 6, wherein the stopper means has a locking protrusion formed to protrude inwardly by pressing at an upper portion of any one of the flanges coupling the first member and the third member and any one of the flanges coupling the second member and the third member to prevent the lower fixing member from being installed at an inclined angle of 30° or less from a vertical direction.

9. The supporting device for a horizontal pipe in four directions of claim 6, wherein the stopper means has a plurality of angle adjustment holes formed at 30°, 45°, and 60° in the flanges coupling the first member and the third member and the flanges coupling the second member and the third member and a fixing hole formed on a central line of the lower fixing member to communicate with any one of the angle adjustment holes formed in the flange, so that the angle adjustment hole and the fixing hole may be fixed to each other by a fixing pin to prevent the lower fixing member from being installed at an inclined angle of 30° or less from a vertical direction.

10. The supporting device for a horizontal pipe in four directions of claim 6, wherein the stopper means has a flat portion formed to support a lower surface of the coupling piece of the lower fixing member at an angle of 30° by coming into a contact with the pipe to prevent the lower fixing member from being installed at an inclined angle of 30° or less from a vertical direction.

* * * * *